United States Patent
Chang et al.

(10) Patent No.: US 10,244,425 B2
(45) Date of Patent: Mar. 26, 2019

(54) ELECTRONIC DEVICE AND METHOD FOR CONTROLLING TRANSMISSION CONTROL PROTOCOL THEREOF

(71) Applicant: Samsung Electronics Co., Ltd., Suwon-si, Gyeonggi-do (KR)

(72) Inventors: Dukhyun Chang, Suwon-si (KR); Taeyoon Kim, Seongnam-si (KR); Chaiman Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 87 days.

(21) Appl. No.: 15/263,904

(22) Filed: Sep. 13, 2016

(65) Prior Publication Data

US 2017/0078913 A1    Mar. 16, 2017

(30) Foreign Application Priority Data

Sep. 14, 2015    (KR) .................. 10-2015-0129755

(51) Int. Cl.
*H04L 12/26* (2006.01)
*H04W 28/02* (2009.01)
*H04L 12/815* (2013.01)

(52) U.S. Cl.
CPC ..... *H04W 28/0273* (2013.01); *H04L 43/0864* (2013.01); *H04L 47/225* (2013.01); *H04L 43/0888* (2013.01); *H04L 43/0894* (2013.01)

(58) Field of Classification Search
CPC .......... H04W 28/0273; H04L 43/0864; H04L 47/225; H04L 43/0888; H04L 43/0894
See application file for complete search history.

(56) References Cited

U.S. PATENT DOCUMENTS

| | | | |
|---|---|---|---|
| 6,904,286 B1* | 6/2005 | Dantu | H04L 47/10 455/450 |
| 9,444,688 B2* | 9/2016 | Lee | H04W 48/16 |
| 9,641,399 B1* | 5/2017 | Makrucki | H04L 41/147 |
| 2002/0046264 A1* | 4/2002 | Dillon | H04B 7/18584 709/219 |
| 2002/0133596 A1* | 9/2002 | Border | H04B 7/18582 709/227 |
| 2003/0219034 A1* | 11/2003 | Lotter | H04L 41/0823 370/469 |
| 2006/0114836 A1* | 6/2006 | Pollin | H04L 1/24 370/252 |
| 2008/0132234 A1* | 6/2008 | Gilliland | H04W 36/0088 455/436 |

(Continued)

*Primary Examiner* — Kevin D Mew
(74) *Attorney, Agent, or Firm* — Jefferson IP Law, LLP

(57) ABSTRACT

An electronic device and a method for controlling transmission control protocol are provided. The electronic device includes a communication circuit, a processor electrically connected to the communication circuit, and a memory electrically connected to the processor. The processor is configured to control for setting a receive window size reference value based on a measured packet round trip time (RTT), identifying a physical layer parameter related to a wireless channel of another electronic device that is different from the electronic device, determining the receive window size based on the physical layer parameter and the reference value, and transmitting the determined receive window size to the other electronic device during transmission of a response message in accordance with data reception.

16 Claims, 14 Drawing Sheets

(56) References Cited

U.S. PATENT DOCUMENTS

| | | | |
|---|---|---|---|
| 2008/0225842 A1* | 9/2008 | Goldfein | H04L 1/1825 370/389 |
| 2010/0054123 A1* | 3/2010 | Yong | H04L 43/0864 370/230 |
| 2010/0246398 A1* | 9/2010 | Chiang | H04L 43/0829 370/235 |
| 2011/0013516 A1* | 1/2011 | Black | H04L 43/0888 370/236 |
| 2011/0302234 A1* | 12/2011 | Monk, IV | H04L 65/80 709/203 |
| 2012/0039176 A1* | 2/2012 | Eshan | H04L 1/0002 370/237 |
| 2012/0201151 A1* | 8/2012 | Kubota | H04L 1/1851 370/252 |
| 2014/0036893 A1* | 2/2014 | Bhanage | H04W 28/0205 370/338 |
| 2014/0044046 A1* | 2/2014 | Vangala | H04W 28/0273 370/328 |
| 2014/0115186 A1* | 4/2014 | Weston | H04L 69/163 709/235 |
| 2014/0241163 A1 | 8/2014 | Lee et al. | |
| 2015/0236966 A1* | 8/2015 | Francini | H04L 47/27 370/235 |
| 2016/0255005 A1* | 9/2016 | Ramaiah | H04L 47/12 370/231 |

\* cited by examiner

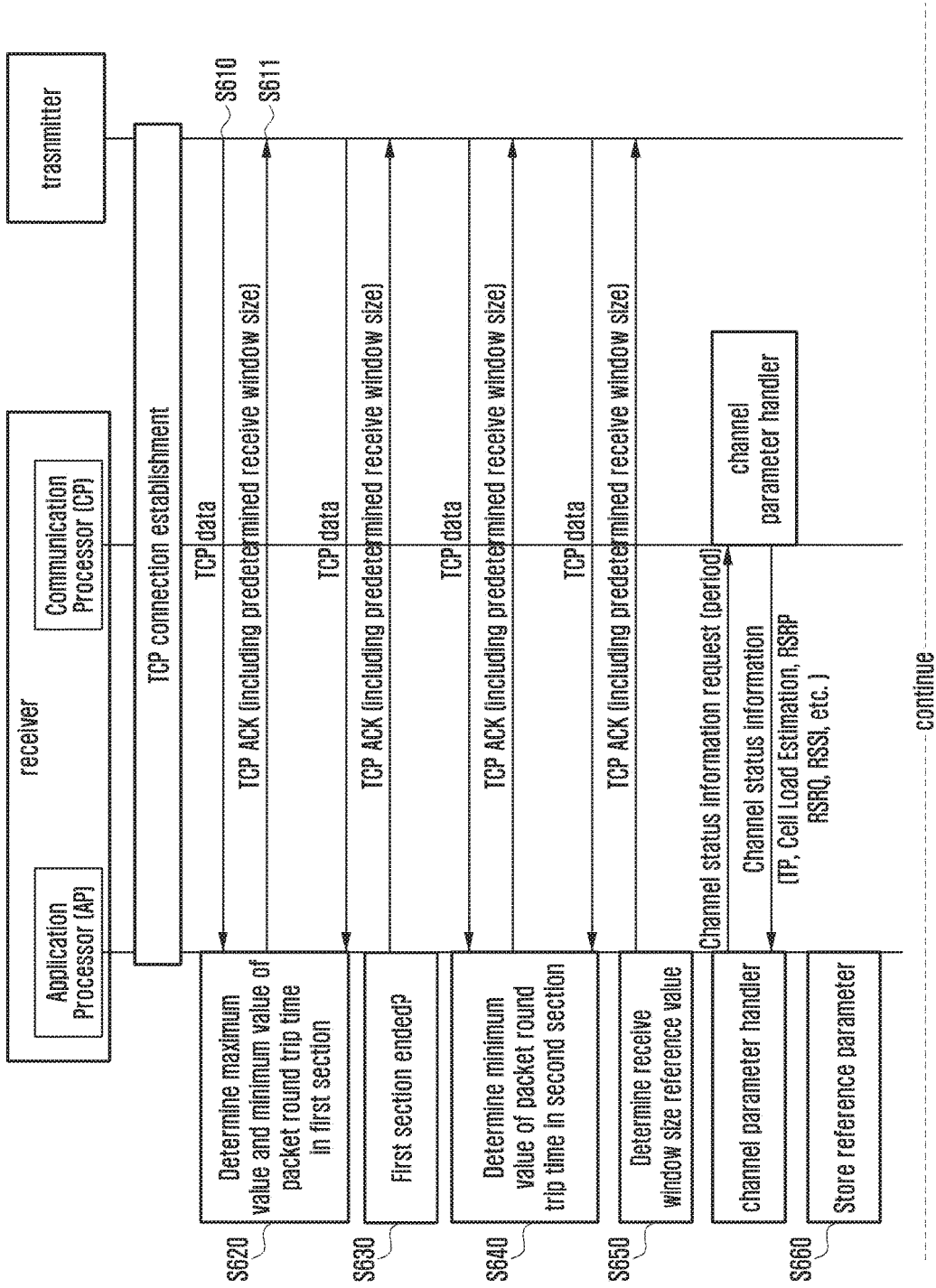

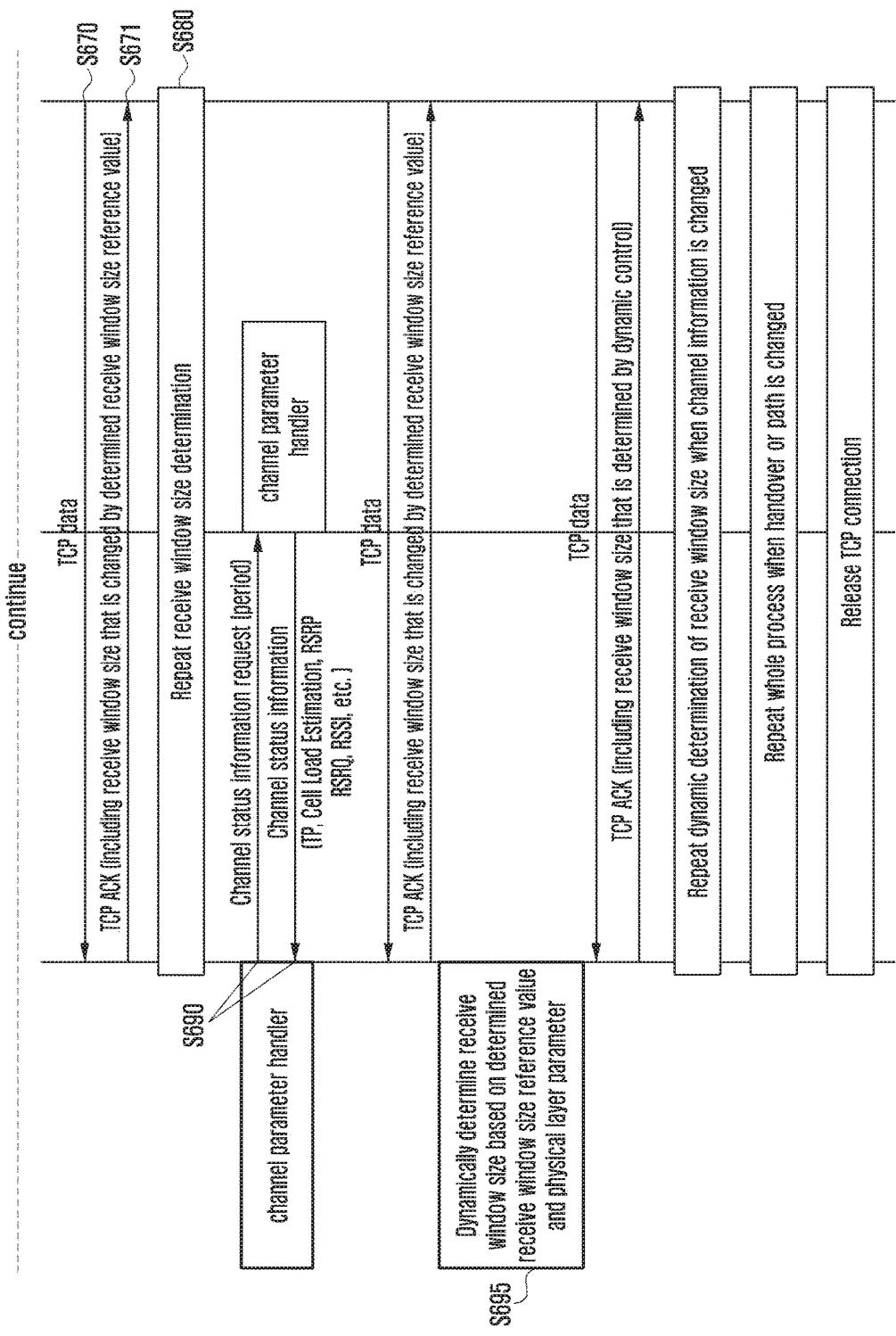

ELECTRONIC DEVICE AND METHOD FOR CONTROLLING TRANSMISSION CONTROL PROTOCOL THEREOF

CROSS-REFERENCE TO RELATED APPLICATION(S)

This application claims the benefit under 35 U.S.C. § 119(a) of a Korean patent application filed on Sep. 14, 2015 in the Korean Intellectual Property Office and assigned Serial number 10-2015-0129755, the entire disclosure of which is hereby incorporated by reference.

TECHNICAL FIELD

The present disclosure relates to a method for controlling a transmission control protocol (TCP). More particularly, the present disclosure relates to a method and an apparatus for optimizing TCP transmission through a dynamic change of a receive window size of an electronic device.

BACKGROUND

In order to perform communication between electronic devices, it is required for respective electronic devices that take part in the communication to support a specific communication protocol, and one of the communication protocols that have been frequently used is a transmission control protocol (TCP).

The TCP has not been designed to keep a high-performance network or a high-performance electronic device environment in mind, but has been designed to put emphasis on equity for the purpose of fairly dividing and using bandwidths.

On the other hand, in the case of performing communication using the TCP, the amount/number of packets that are transmitted by a transmitter may exert an influence on the TCP performance. For example, if the amount/number of packets being transmitted is excessively large in comparison to a network situation, a packet round trip time may be lengthened through buffering, whereas if the amount/number of packets being transmitted is excessively small, data throughput per hour may be reduced. Accordingly, in the case of performing communication using the TCP, a method for optimizing the TCP performance is required.

For example, a transmitter can adjust the amount/number of packets that are transmitted to a network through adjustment of a transmit window (swnd) size which means the amount/number of packets that can be transmitted at a time even without receiving an acknowledgement (ACK) from a receiver, and thus the TCP performance can be improved.

The above information is presented as background information only to assist with an understanding of the present disclosure. No determination has been made, and no assertion is made, as to whether any of the above might be applicable as prior art with regard to the present disclosure.

SUMMARY

However, the transmit window size is unable to exceed a receive window (rwnd) size that means the amount/number of packets that can be received at a time before an acknowledgement (ACK) is transmitted. Accordingly, a configuration that adjusts the transmit window size has the problem that it is unable to transmit packets of which the amount exceeds the receive window size even in a good network situation and thus the transmission control protocol (TCP) transmission cannot be optimized.

In contrast, various aspects of the present disclosure can dynamically adjust a receive window size in accordance with a network situation through a dynamic change of the receive window size using a packet round trip time (RTT) and a physical layer parameter.

Aspects of the present disclosure are to address at least the above-mentioned problems and/or disadvantages and to provide at least the advantages described below. Accordingly, an aspect of the present disclosure is to provide a method and an apparatus for optimizing TCP transmission through a dynamic change of a receive window size of an electronic device.

In accordance with an aspect of the present disclosure, an electronic device is provided. The electronic device includes a communication circuit, a processor electrically connected to the communication circuit, and a memory electrically connected to the processor, wherein the memory, when executed, includes instructions to cause the processor to set a receive window size reference value based on a measured packet Round Trip Time (RTT), to identify a physical layer parameter related to a wireless channel of another electronic device that is different from the electronic device, to determine the receive window size based on the physical layer parameter and the reference value, and to transmit the determined receive window size to the other electronic device during transmission of a response message in accordance with data reception.

In accordance with another aspect of the present disclosure, a method for controlling a transmission control protocol (TCP) of an electronic device is provided. The method includes setting a receive window size reference value based on a measured packet round trip time (RTT), identifying a physical layer parameter related to a wireless channel of another electronic device that is different from the electronic device, determining the receive window size based on the physical layer parameter and the receive window size reference value, and transmitting the determined receive window size to the other electronic device during transmission of a response message in accordance with data reception.

According to various embodiments of the present disclosure, the electronic device can effectively increase the data throughput per hour in accordance with the network situation through the dynamic change of the receive window size using the packet round trip time (RTT) and the physical layer parameter.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 6A and 6B are diagrams illustrating a process in which an electronic device determines a receive window size according to various embodiments of the present disclosure;

FIGS. 7A, 7B, and 7C are diagrams illustrating a process of determining a receive window size reference value of an electronic device, wherein FIG. 7A is a diagram illustrating a process of determining a round trip time (RTT) maximum value and a first RTT minimum value in a first section of an electronic device according to various embodiments of the present disclosure, FIG. 7B is a diagram illustrating a process of determining a second RTT minimum value in a second section according to various embodiments of the present disclosure, and FIG. 7C is a diagram illustrating a process in which an electronic device determines a receive window size reference value according to various embodiments of the present disclosure;

Throughout the drawings, it should be noted that like reference numbers are used to depict the same or similar elements, features, and structures.

DETAILED DESCRIPTION

Figure 1:
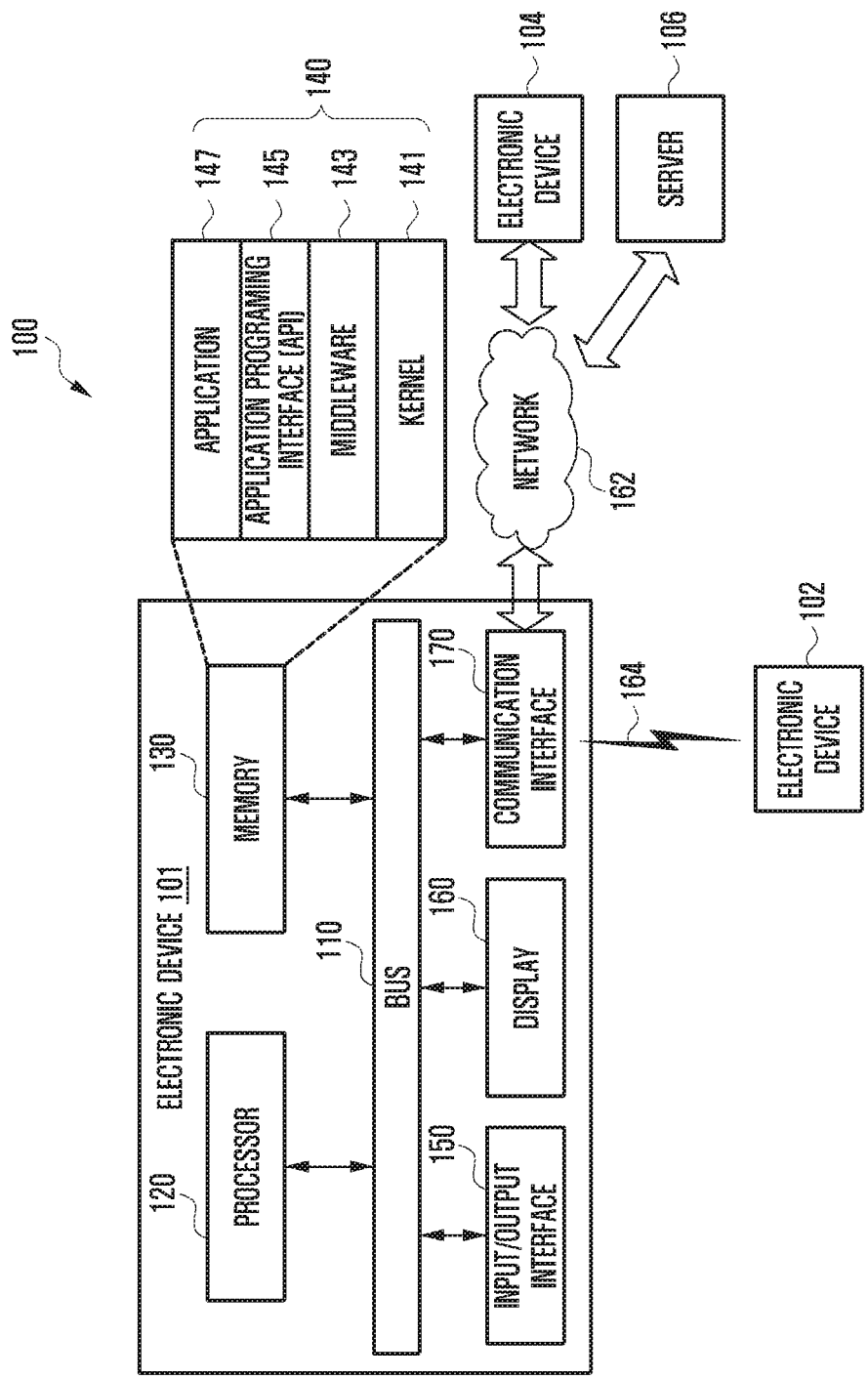
FIG. 1 is a diagram explaining a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An expression "comprising" or "may comprise" used in the present disclosure indicates presence of a corresponding function, operation, or element and does not limit additional at least one function, operation, or element. Further, in the present disclosure, a term "comprise" or "have" indicates presence of a characteristic, numeral, operation, element, component, or combination thereof described in a specification and does not exclude presence or addition of at least one other characteristic, numeral, operation, element, component, or combination thereof.

In the present disclosure, an expression "or" includes any combination or the entire combination of together listed words. For example, "A or B" may include A, B, or A and B.

An expression of a first and a second in the present disclosure may represent various elements of the present disclosure, but do not limit corresponding elements. For example, the expression does not limit order and/or importance of corresponding elements. The expression may be used for distinguishing one element from another element. For example, both a first user device and a second user device are user devices and represent different user devices. For example, a first constituent element may be referred to as a second constituent element without deviating from the scope of the present disclosure, and similarly, a second constituent element may be referred to as a first constituent element.

When it is described that an element is "coupled" to another element, the element may be "directly coupled" to the other element or "electrically coupled" to the other element through a third element. However, when it is described that an element is "directly coupled" to another element, no element may exist between the element and the other element.

Unless differently defined, entire terms including a technical term and a scientific term used here have the same meaning as a meaning that may be generally understood by a person of common skill in the art. It should be analyzed that generally using terms defined in a dictionary have a meaning corresponding to that of a context of related technology and are not analyzed as an ideal or excessively formal meaning unless explicitly defined.

In this disclosure, an electronic device may be a device that involves a communication function. For example, an electronic device may be a smart phone, a tablet personal computer (PC), a mobile phone, a video phone, an e-book reader, a desktop PC, a laptop PC, a netbook computer, a personal digital assistant (PDA), a portable multimedia player), a Moving Picture Experts Group phase 1 or phase 2 (MPEG-1 or MPEG-2) audio layer 3 (MP3) player, a portable medical device, a digital camera, or a wearable device (e.g., a head-mounted device) such as electronic glasses, electronic clothes, an electronic bracelet, an electronic necklace, an electronic appcessory, or a smart watch).

According to various embodiments, an electronic device may be a smart home appliance that involves a communication function. For example, an electronic device may be a television (TV), a digital versatile disc (DVD) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame.

According to various embodiments, an electronic device may be a medical device (e.g., magnetic resonance angiography (MRA), magnetic resonance imaging (MRI), computed tomography (CT), ultrasonography, etc.), a navigation device, a global positioning system (GPS) receiver, an event data recorder (EDR), a flight data recorder (FDR), a car infotainment device, electronic equipment for ship (e.g., a marine navigation system, a gyrocompass, etc.), avionics, security equipment, or an industrial or home robot.

According to various embodiments, an electronic device may be furniture or part of a building or construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof. As well understood by those skilled in the art, the above-mentioned electronic devices are not to be considered as a limitation of this disclosure.

FIG. 1 is a block diagram 100 illustrating an electronic apparatus according to an embodiment of the present disclosure.

Referring to FIG. 1, the electronic apparatus 101 may include a bus 110, a processor 120, a memory 130, a user input module 150, a display 160, and a communication interface 170.

The bus 110 may be a circuit for interconnecting elements described above and for allowing a communication, e.g. by transferring a control message, between the elements described above.

The processor 120 can receive commands from the above-mentioned other elements, e.g. the memory 130, the user input module 150, the display 160, and the communication interface 170, through for example, the bus 110, can decipher the received commands, and perform operations and/or data processing according to the deciphered commands.

The memory 130 can store commands received from the processor 120 and/or other elements, e.g. the user input module 150, the display 160, and the communication interface 170, and/or commands and/or data generated by the processor 120 and/or other elements. The memory 130 may include software and/or programs 140, such as a kernel 141, middleware 143, an application programming interface (API) 145, and an application 147. Each of the programming modules described above may be configured by software, firmware, hardware, and/or combinations of two or more thereof.

Referring to FIG. 1, the kernel 141 can control and/or manage system resources, e.g. the bus 110, the processor 120 or the memory 130, used for execution of operations and/or functions implemented in other programming modules, such as the middleware 143, the API 145, and/or the application 147. Further, the kernel 141 can provide an interface through which the middleware 143, the API 145, and/or the application 147 can access and then control and/or manage an individual element of the electronic apparatus 101.

The middleware 143 can perform a relay function which allows the API 145 and/or the application 147 to communicate with and exchange data with the kernel 141. Further, in relation to operation requests received from at least one of an application 147, the middleware 143 can perform load balancing in relation to the operation requests by, for example, giving a priority in using a system resource, e.g. the bus 110, the processor 120, and/or the memory 130, of the electronic apparatus 101 to at least one application from among the at least one of the application 147.

The API 145 is an interface through which the application 147 can control a function provided by the kernel 141 and/or the middleware 143, and may include, for example, at least one interface or function for file control, window control, image processing, and/or character control.

The user input module 150 can receive, for example, a command and/or data from a user, and transfer the received command and/or data to the processor 120 and/or the memory 130 through the bus 110. The display 160 can display an image, a video, and/or data to a user.

The communication interface 170 can establish a communication between the electronic apparatus 101 and other electronic devices 102 and 104 and/or a server 106. The communication interface 170 can support short range communication 164, via short range communication protocols, e.g. a wireless fidelity (Wi-Fi) protocol, a Bluetooth (BT) protocol, and a near field communication (NFC) protocol, communication networks, e.g. internet, local area network (LAN), wide area network (WAN), a telecommunication network, a cellular network, and a satellite network, or a plain old telephone service (POTS), or any other similar and/or suitable communication networks, such as network 162, or the like. Each of the electronic devices 102 and 104 may be a same type and/or different types of electronic apparatus.

Figure 2:
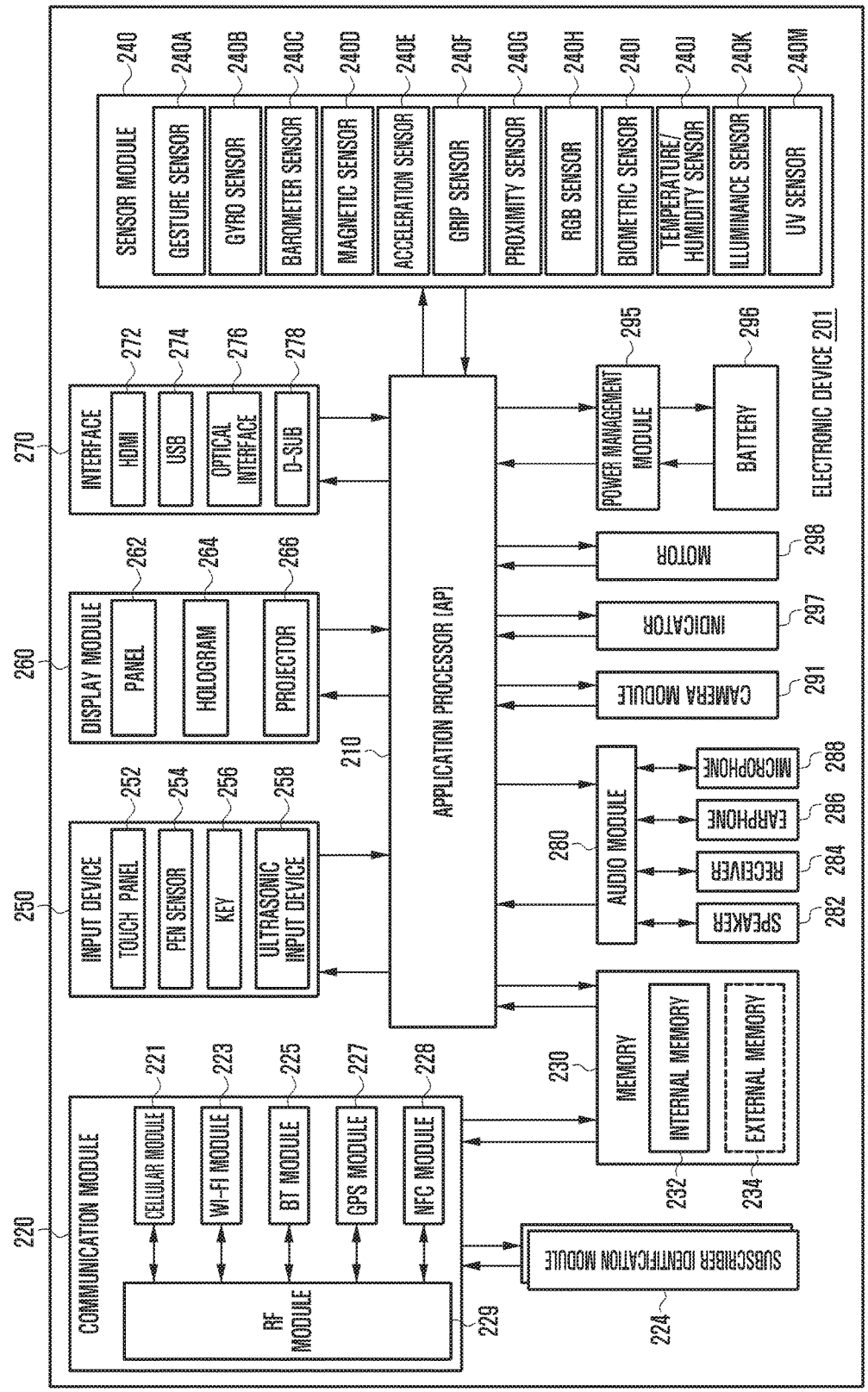
FIG. 2 is a block diagram of an electronic device according to various embodiments of the present disclosure.

FIG. 2 is a block diagram illustrating an electronic device 201 according to an embodiment of the present disclosure. The electronic device 201 may form, for example, the whole or part of the electronic device 101 shown in FIG. 1.

Referring to FIG. 2, the electronic device 201 may include at least one application processor (AP) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The AP 210 may drive an operating system or applications, control a plurality of hardware or software components connected thereto, and also perform processing and operation for various data including multimedia data. The AP 210 may be formed of system-on-chip (SoC), for example. According to an embodiment, the AP 210 may further include a graphics processing unit (GPU) (not shown).

The communication module 220 (e.g., the communication interface 170) may perform a data communication with any other electronic device (e.g., the electronic device 104 or the server 106 shown in FIG. 1) connected to the electronic device 200 (e.g., the electronic device 101 shown in FIG. 1) through the network. According to an embodiment, the communication module 220 may include therein a cellular module 221, a Wi-Fi module 323, a BT module 225, a GPS module 227, an NFC module 228, and a radio frequency (RF) module 229.

The cellular module 221 may offer a voice call, a video call, a message service, an internet service, or the like through a communication network (e.g., long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), etc.). Additionally, the cellular module 221 may perform identification and authentication of the electronic device in the communication network, using the SIM card 224. According to an embodiment, the cellular module 221 may perform at least part of functions the AP 210 can provide. For example, the cellular module 221 may perform at least part of a multimedia control function.

According to an embodiment, the cellular module 221 may include a communication processor (CP). Additionally, the cellular module 221 may be formed of SoC, for example. Although some elements such as the cellular module 221 (e.g., the CP), the memory 230, or the power management module 295 are shown as separate elements being different from the AP 210 in FIG. 3, the AP 210 may be formed to have at least part (e.g., the cellular module 221) of the above elements in an embodiment.

According to an embodiment, the AP 210 or the cellular module 221 (e.g., the CP) may load commands or data, received from a nonvolatile memory connected thereto or from at least one of the other elements, into a volatile memory to process them. Additionally, the AP 210 or the cellular module 221 may store data, received from or created at one or more of the other elements, in the nonvolatile memory.

Each of the Wi-Fi module 223, the BT module 225, the GPS module 227 and the NFC module 228 may include a processor for processing data transmitted or received therethrough. Although FIG. 2 shows the cellular module 221, the Wi-Fi module 223, the BT module 225, the GPS module 227 and the NFC module 228 as different blocks, at least part of them may be contained in a single integrated circuit (IC) chip or a single IC package in an embodiment. For example, at least part (e.g., the CP corresponding to the cellular module 221 and a Wi-Fi processor corresponding to the Wi-Fi module 223) of respective processors corresponding to the cellular module 221, the Wi-Fi module 223, the BT module 225, the GPS module 227 and the NFC module 228 may be formed as a single SoC.

Figure 3:
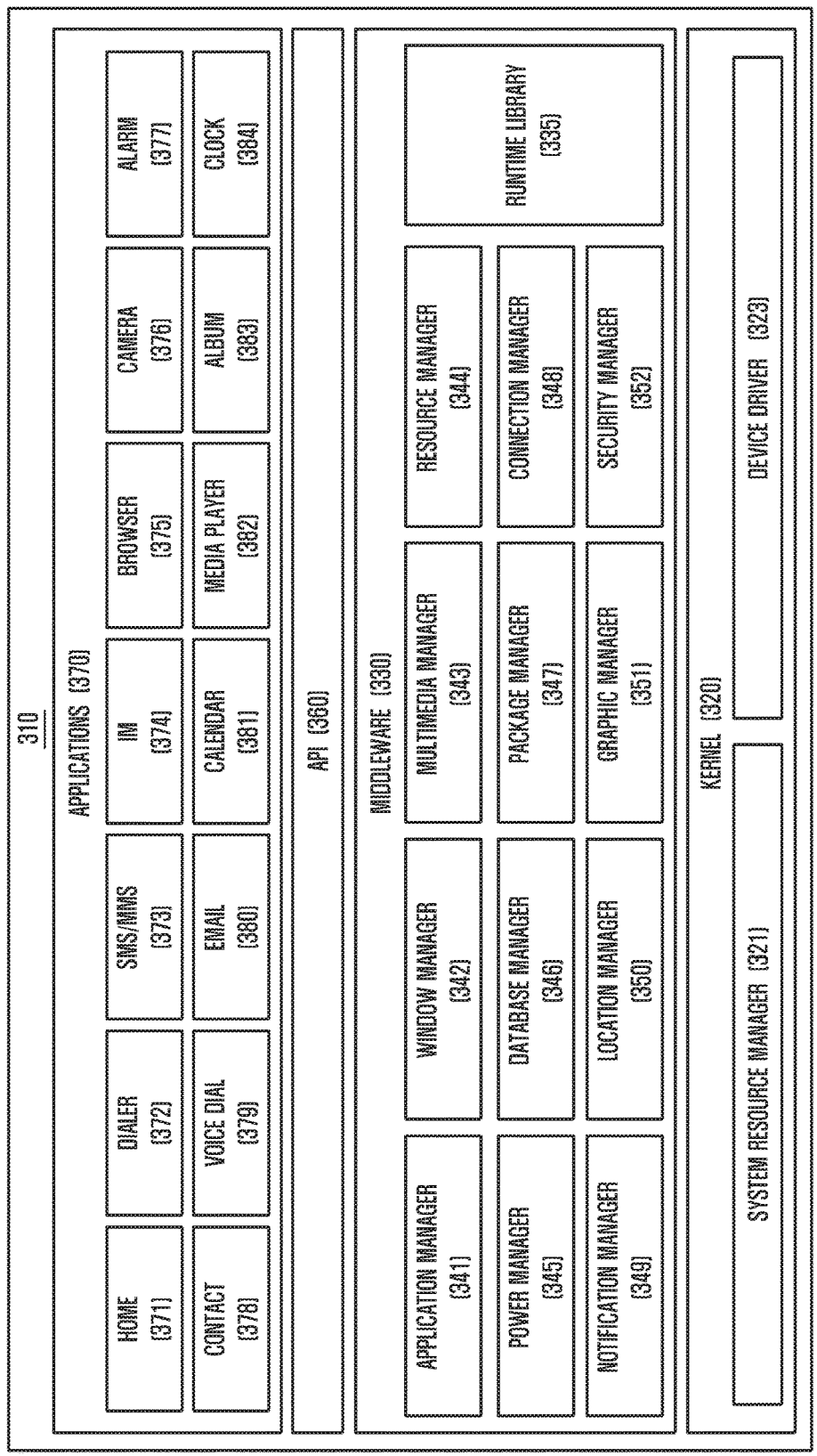
FIG. 3 is a block diagram of a program module according to various embodiments of the present disclosure.

The RF module 229 may transmit and receive data, e.g., RF signals or any other electric signals. Although not shown, the RF module 229 may include a transceiver, a power amp module (PAM), a frequency filter, a low noise amplifier (LNA), or the like. Also, the RF module 229 may include any component, e.g., a wire or a conductor, for transmission of electromagnetic waves in a free air space. Although FIG. 3 shows that the cellular module 221, the Wi-Fi module 223, the BT module 225, the GPS module 227 and the NFC module 228 share the RF module 229, at least one of them may perform transmission and reception of RF signals through a separate RF module in an embodiment.

The SIM card 224 may be a specific card formed of SIM and may be inserted into a slot formed at a certain place of the electronic device 201. The SIM card 224 may contain therein an IC card identifier (ICCID) or an international mobile subscriber identity (IMSI).

The memory 230 (e.g., the memory 130) may include an internal memory 232 and an external memory 234. The internal memory 232 may include, for example, at least one of a volatile memory (e.g., dynamic random access memory (DRAM), static RAM (SRAM), synchronous DRAM (SDRAM), etc.) or a nonvolatile memory (e.g., one time programmable read only memory (OTPROM), programmable ROM (PROM), erasable and programmable ROM (EPROM), electrically erasable and programmable ROM (EEPROM), mask ROM, flash ROM, NAND flash memory, NOR flash memory, etc.).

According to an embodiment, the internal memory 232 may have the form of a solid state drive (SSD). The external memory 234 may include a flash drive, e.g., compact flash (CF), secure digital (SD), micro-SD, mini-SD, extreme digital (xD), memory stick, or the like. The external memory 334 may be functionally connected to the electronic device 201 through various interfaces. According to an embodiment, the electronic device 301 may further include a storage device or medium such as a hard drive.

The sensor module 240 may measure physical quantity or sense an operating status of the electronic device 201, and then convert measured or sensed information into electric signals. The sensor module 240 may include, for example, at least one of a gesture sensor 240A, a gyro sensor 240B, an atmospheric sensor 240C, a magnetic sensor 240D, an acceleration sensor 240E, a grip sensor 240F, a proximity sensor 240G, a color sensor 240H (e.g., red, green, blue (RGB) sensor), a biometric sensor 240I, a temperature-humidity sensor 240J, an illumination sensor 240K, and an ultraviolet (UV) sensor 240M. Additionally or alternatively, the sensor module 240 may include, e.g., an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris scan sensor (not shown), or a finger scan sensor (not shown). Also, the sensor module 240 may include a control circuit for controlling one or more sensors equipped therein.

The input device 250 may include a touch panel 252, a digital pen sensor 254, a key 256, or an ultrasonic input unit 258. The touch panel 252 may recognize a touch input in a manner of capacitive type, resistive type, infrared type, or ultrasonic type. Also, the touch panel 252 may further include a control circuit. In case of a capacitive type, a physical contact or proximity may be recognized. The touch panel 252 may further include a tactile layer. In this case, the touch panel 252 may offer a tactile feedback to a user.

A digital stylus or digital pen sensor 254 may be formed in the same or similar manner as receiving a touch input or by using a separate recognition sheet. The key 256 may include, for example, a physical button, an optical key, or a keypad. The ultrasonic input unit 258 is a specific device capable of identifying data by sensing sound waves with a microphone 288 in the electronic device 201 through an input tool that generates ultrasonic signals, thus allowing wireless recognition. According to an embodiment, the electronic device 201 may receive a user input from any external device (e.g., a computer or a server) connected thereto through the communication module 220.

The display 260 (e.g., the display 250) may include a panel 262, a hologram 264, or a projector 266. The panel 262 may be, for example, liquid crystal display (LCD), active matrix organic light emitting diode (AMOLED) or plastic OLED (POLED), or the like. The panel 262 may have a flexible, transparent or wearable form. The panel 262 may be formed of a single module with the touch panel 252. The hologram 264 may show a stereoscopic image in the air using interference of light. The projector 266 may project an image onto a screen, which may be located at the inside or outside of the electronic device 201. According to an embodiment, the display 260 may further include a control circuit for controlling the panel 262, the hologram 264, and the projector 266.

The interface 270 may include, for example, a high-definition multimedia interface (HDMI) 272, a universal serial bus (USB) 274, an optical interface 276, or a D-sub-miniature (D-sub) 278. The interface 270 may be contained, for example, in the communication interface 160 shown in FIG. 1. Additionally or alternatively, the interface 270 may include, for example, a mobile high-definition link (MHL) interface, an SD card/multi-media card (MMC) interface, or an infrared data association (IrDA) interface.

The audio module 280 may perform a conversion between sounds and electric signals. The audio module 280 may process sound information inputted or outputted through a speaker 282, a receiver 284, an earphone 286, or a microphone 288.

The camera module 291 is a device capable of obtaining still images and moving images. According to an embodiment, the camera module 291 may include at least one image sensor (e.g., a front sensor or a rear sensor), a lens (not shown), an image signal processor (ISP), not shown), or a flash (e.g., LED or xenon lamp, not shown).

The power management module 295 may manage electric power of the electronic device 201. Although not shown, the power management module 295 may include, for example, a power management IC (PMIC), a charger IC, or a battery or fuel gauge.

The PMIC may be formed, for example, of an IC chip or SoC. Charging may be performed in a wired or wireless manner. The charger IC may charge a battery 296 and prevent overvoltage or overcurrent from a charger. According to an embodiment, the charger IC may have a charger IC used for at least one of wired and wireless charging types. A wireless charging type may include, for example, a magnetic resonance type, a magnetic induction type, or an electro-magnetic type. Any additional circuit for a wireless charging may be further used such as a coil loop, a resonance circuit, or a rectifier.

The battery gauge may measure the residual amount of the battery 296 and a voltage, current or temperature in a charging process. The battery 296 may store or create electric power therein and supply electric power to the electronic device 201. The battery 296 may be, for example, a rechargeable battery or a solar battery.

The indicator 297 may show thereon a current status (e.g., a booting status, a message status, or a recharging status) of the electronic device 201 or of its part (e.g., the AP 210). The motor 298 may convert an electric signal into a mechanical vibration. Although not shown, the electronic device 301 may include a specific processor (e.g., GPU) for supporting a mobile TV. This processor may process media data that comply with standards of digital multimedia broadcasting (DMB), digital video broadcasting (DVB), or media flow.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

The term "module" used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of application-specific IC (ASIC) chip, field-programmable gate arrays (FPGAs), and programmable-logic device, which have been known or are to be developed.

FIG. 3 is a block diagram illustrating a configuration of a programming module 310 according to an embodiment of the present disclosure.

Referring to FIG. 3, the programming module 310 may be included (or stored) in the electronic device 201 (e.g., the memory 130 shown in FIG. 1) illustrated in FIG. 2 or may be included (or stored) in the electronic device 201 (e.g., the memory 230) illustrated in FIG. 2. At least a part of the programming module 310 may be implemented in software, firmware, hardware, or a combination of two or more thereof. The programming module 310 may be implemented in hardware, and may include an operating system (OS) controlling resources related to an electronic device (e.g., the electronic device 101 or 201) and/or various applications (e.g., an application 370) executed in the OS. For example, the OS may be Android™, iOS™, Windows™ Symbian®, Tizen®, Bada®, and the like.

Referring to FIG. 3, the programming module 310 may include a kernel 320, a middleware 330, an API 360, and/or the application 370.

The kernel 320 (e.g., the kernel 141 shown in FIG. 1) may include a system resource manager 321 and/or a device driver 323. The system resource manager 321 may include, for example, a process manager (not illustrated), a memory manager (not illustrated), and a file system manager (not illustrated). The system resource manager 321 may perform the control, allocation, recovery, and/or the like of system resources. The device driver 323 may include, for example, a display driver (not illustrated), a camera driver (not illustrated), a BT driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 323 may include an inter-process communication (IPC) driver (not illustrated).

The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 143 shown in FIG. 1) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include, for example, a library module used by a complier, in order to add a new function by using a programming language during the execution of the application 370. According to an embodiment of the present disclosure, the runtime library 335 may perform functions which are related to input and output, the management of a memory, an arithmetic function, and/or the like.

The application manager 341 may manage, for example, a life cycle of at least one of the applications 370. The window manager 342 may manage graphical user interface (GUI) resources used on the screen. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370.

The power manager 345 may operate together with a basic input/output system (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity such as, for example, Wi-Fi and BT. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the present disclosure, when the electronic device (e.g., the electronic device 101 shown in FIG. 1) has a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements described in the various embodiments of the present disclosure, may further include other elements, or may replace the some of the elements with elements, each of which performs a similar function and has a different name.

The API 460 (e.g., the API 145) is a set of API programming functions, and may be provided with a different configuration according to an OS. In the case of Android™ or iOS™, for example, one API set may be provided to each platform. In the case of Tizen®, for example, two or more API sets may be provided to each platform.

The applications 370 (e.g., the applications 147 shown in FIG. 1) may include, for example, a preloaded application and/or a third party application. The applications 370 (e.g., the applications 147) may include, for example, a home application 371, a dialer application 372, a short message service (SMS)/multimedia message service (MMS) application 373, an instant message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 310 may be implemented by instructions stored in a non-transitory computer-readable storage medium. When the instructions are executed by one or more processors (e.g., the application processor (AP) 210), the one or more processors may perform functions corresponding to the instructions. The non-transitory computer-readable storage medium may be, for example, the memory 220. At least a part of the programming module 310 may be implemented (e.g., executed) by, for example, the one or more processors. At least a part of the programming module 310 may include, for example, a module, a program, a routine, a set of instructions, and/or a process for performing one or more functions.

According to the various embodiments of the present disclosure, the electronic device explained below can contain all or several of the components of the electronic device illustrated in FIGS. 1 to 3.

Figure 4:
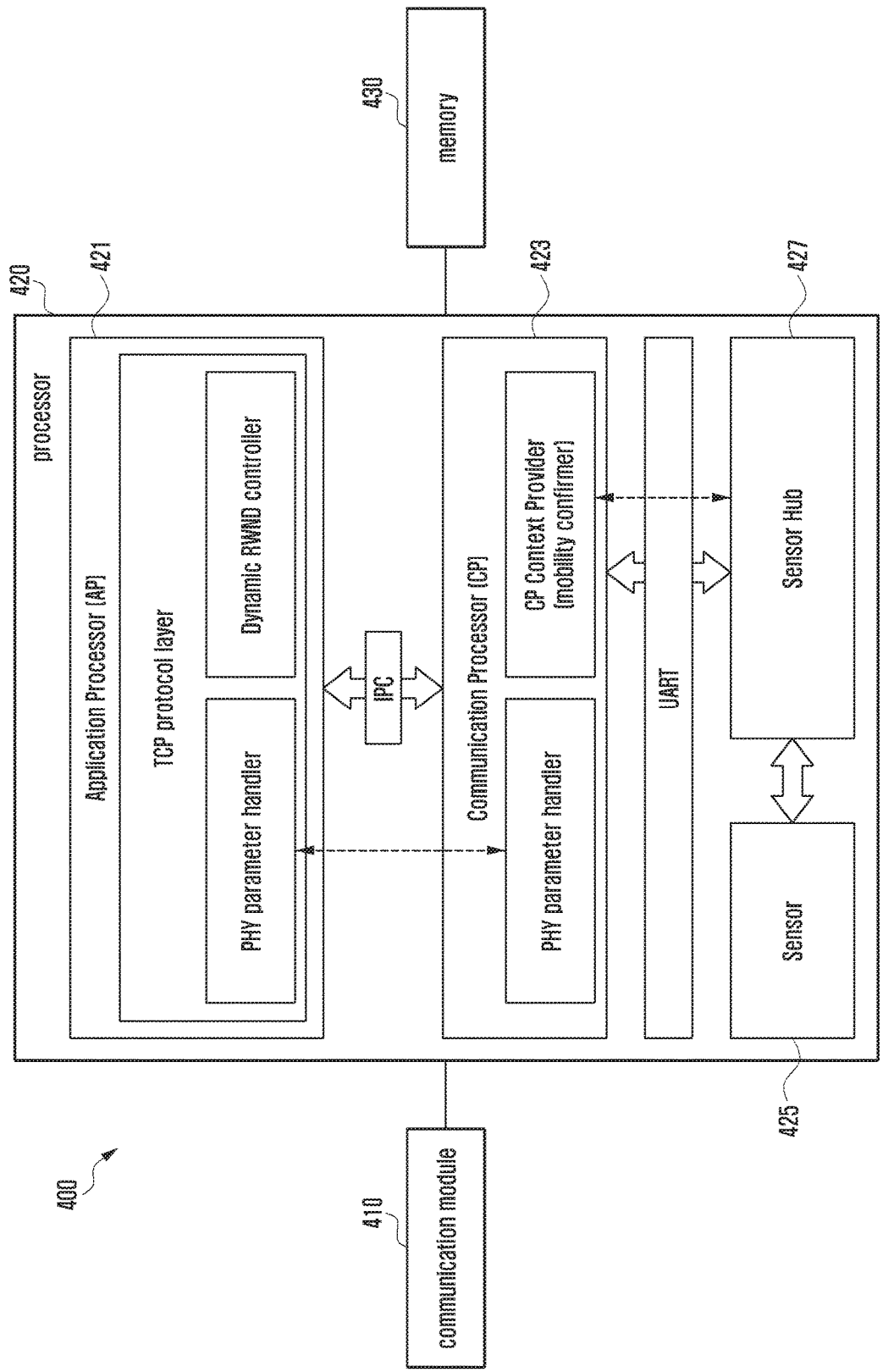
FIG. 4 is a diagram illustrating the configuration of an electronic device according to various embodiments of the present disclosure.

FIG. 4 is a diagram illustrating the configuration of an electronic device 400 according to various embodiments of the present disclosure.

Referring to FIG. 4, an electronic device 400 may include constituent elements that are the same as or similar to those of the electronic devices 101 and 201 illustrated in FIGS. 1 and 2. For example, the electronic device 400 may include the whole or a part of the constituent elements of the electronic devices 101 and 201 illustrated in FIGS. 1 and 2.

According to various embodiments of the present disclosure, the electronic device 400 may include a communication module 410, a processor 420, and a memory 430.

According to various embodiments of the present disclosure, the communication module 410 may transmit/receive a signal with another network entity. For example, the communication module 410 of the electronic device may transmit/receive a message for establishing a transmission control protocol (TCP) from a base station. Further, the communication module 410 may transmit/receive data with the base station. The communication module can also be referred to as communication circuit.

According to various embodiments of the present disclosure, the processor 420 may include an application processor (AP 421, a communication processor (CP, a sensor 425, and a sensor hub 427.

According to various embodiments of the present disclosure, the AP 421 may include a physical layer parameter handler and a dynamic receive window size controller.

The physical layer parameter handler may request channel status information from the communication processor (CP) 423 in accordance with a pre-stored period to receive the channel status information.

The channel status information may include, for example, data throughput (TP) per hour, cell load measurement value, reference signal receive power (RSRP), reference signal receive quality (RSRQ), and receive signal strength indicator (RSSI).

The channel status information is information measured in a wireless link or a wireless channel, and may include a parameter that is measured on a physical layer (hereinafter referred to as "physical layer parameter").

The dynamic receive window size controller may set a receive window size reference value using packet round trip time (RTT) (hereinafter, it may be interchangeably used with RTT) of data that is received from a transmitter.

Further, the dynamic receive window size controller may adjust the receive window size using the physical layer parameter that is received from the CP 423 and the set receive window size reference value.

The physical layer parameter is a parameter that can be instantaneously measured, and may be changed abruptly or occasionally in accordance with a channel situation. Accordingly, in the case of adjusting the receive window size using only the physical layer parameter, the receive window size may be changed abruptly or occasionally. According to various embodiments of the present disclosure, the electronic device may determine the receive window size reference value using the packet RTT, and may determine the receive window size through change of the reference value using the physical layer parameter.

For example, the electronic device may set the receive window size reference value by increasing/decreasing the value in the unit of 500, such as 500, 1000, 1500, and the like. Here, the receive window size means the number of packets that can be received, and the size of one packet may correspond to a maximum segment size (MSS) that is determined when a TCP connection is established. Further, if the receive window size reference value is set to 1500, the electronic device may determine the receive window size by increasing/decreasing the receive window size reference value in the unit of 100 using the physical layer parameter. In the above-described embodiment, a method for the electronic device to set the window size reference value in the unit of 500 is exemplified, but is not limited thereto. That is, the electronic device may set the window reference value in the unit of several different numeral values. A method for setting a receive window size reference value and a method for determining a receive window size using a physical layer parameter will be described in detail later.

Further, the dynamic receive window size controller may set a reference channel parameter. In comparison to the physical layer parameter, the reference channel parameter may mean a parameter that is used to determine whether a channel state has been changed and to determine whether to change the receive window size.

Accordingly, the dynamic receive window size controller may set a physical layer parameter that is first received after the TCP connection as the reference channel parameter, and may determine whether to change the receive window size through comparison of this with a physical layer parameter that is acquired in accordance with a channel status information request of the AP.

Further, the dynamic receive window size controller may set an average value of physical layer parameters that are continuously received as the reference channel parameter, and may determine whether to change the receive window size through comparison of this with a physical layer parameter that is acquired in accordance with the channel status information request of the AP.

According to various embodiments of the present disclosure, the CP 423 may include a physical layer parameter handler and a communication processor (CP) context provider.

According to various embodiments of the present disclosure, the physical layer parameter handler may acquire channel status information through measurement of the channel state continuously, in accordance with a predetermined period, or non-periodically when a specific event occurs. Further, if a channel status information request is received from the AP, the physical layer parameter handler may transmit the acquired channel status information to the AP.

According to various embodiments of the present disclosure, the communication processor (CP) context provider may receive information related to mobility of the electronic device that is determined using the sensor 425 and the sensor hub 427. Further, the CP context provider may transmit the received information related to the mobility of the electronic device to the AP in accordance with the channel status information request of the AP. Further, the CP context provider may transmit information, in which cell related information (e.g., handover related information) is added to the information related to the mobility of the electronic device, to the AP.

According to various embodiments of the present disclosure, the sensor 425 and the sensor hub 427 may determine the mobility of the electronic device and may provide the information to the CP context provider (e.g., via a universal asynchronous receiver/transmitter (UART) as shown in FIG. 4). The sensor 425 and the sensor hub 427 may identify the mobility of the electronic device using an acceleration sensor, an illumination sensor, a geomagnetic sensor, a Wi-Fi AP signal, and cell change of a cellular network.

For example, in the case where the electronic device is moving, it may abruptly go away from a serving base station, and handover may occur several times to cause the channel state to be abruptly changed or to be occasionally changed. Accordingly, even in the case where the channel state has been changed, the electronic device may determine the mobility of the electronic device through the sensor 425 and the sensor hub 427. In this case, if it is determined that the electronic device is moving, the electronic device may not adjust the receive window size. Further, the electronic device may continuously monitor the channel state until the channel state is stabilized, and may adjust the receive window size after the channel state is stabilized.

As described above, the electronic device can adjust the receive window size based on the mobility of the electronic device, and the detailed contents thereof will be described later.

According to various embodiments of the present disclosure, with reference to FIG. 4, the memory 430 may store the parameter that is required to determine the receive window size.

For example, the storage 430 may store a period that is required for the AP 421 to request the channel status information from the CP 423 and a period for the CP to measure the channel state. Further, the memory 430 may set a physical layer parameter that the AP has first received after the TCP connection as the reference channel parameter to be stored. Further, the memory 430 may set an average value of physical layer parameters that are continuously received as the reference channel parameter to be stored.

Further, the memory 430 may set a critical value range that is required to set the receive window size reference value.

According to various embodiments of the present disclosure, the memory 430, when executed, may include instructions to cause the processor to set the receive window size reference value based on a measured packet round trip time (RTT), to identify a physical layer parameter related to a wireless channel of another electronic device that is different from the electronic device, to determine the receive window size based on the physical layer parameter and the receive window size reference value, and to transmit the determined receive window size to the other electronic device during transmission of a response message in accordance with data reception.

Referring to FIG. 4, the memory 430 according to various embodiments of the present disclosure, when executed, may include instructions to cause the processor to increase or decrease the set receive window size reference value in accordance with the physical layer parameter.

The memory 430 according to various embodiments of the present disclosure, when executed, may include instructions to cause the processor to decrease the set receive window size reference value by a fixed value if the physical layer parameter has a value that is smaller than a minimum value in a preset reference channel parameter range, and to increase the set receive window size reference value by the fixed value if the physical layer parameter has a value that exceeds a maximum value in the preset reference channel parameter range.

The memory 430 according to various embodiments of the present disclosure, when executed, may include instructions to cause the processor to determine the receive window size based on at least one of terminal mobility related information and handover related information.

The memory 430 according to various embodiments of the present disclosure, when executed, may include instructions to cause the processor to determine the receive window size based on a data transmission rate between the terminal and the base station and a data transmission rate between the base station and a server.

The memory 430 according to various embodiments of the present disclosure, when executed, may include instructions to cause the processor to increase the receive window size reference value if a difference between an RTT minimum value that is measured in a first section and an RTT minimum value that is measured in a second section exceeds a maximum value in a preset range, and to decrease the receive window size reference value if the difference between the RTT minimum value that is measured in the first section and the RTT minimum value that is measured in the second section is smaller than a minimum value in the reset range.

Figure 5:
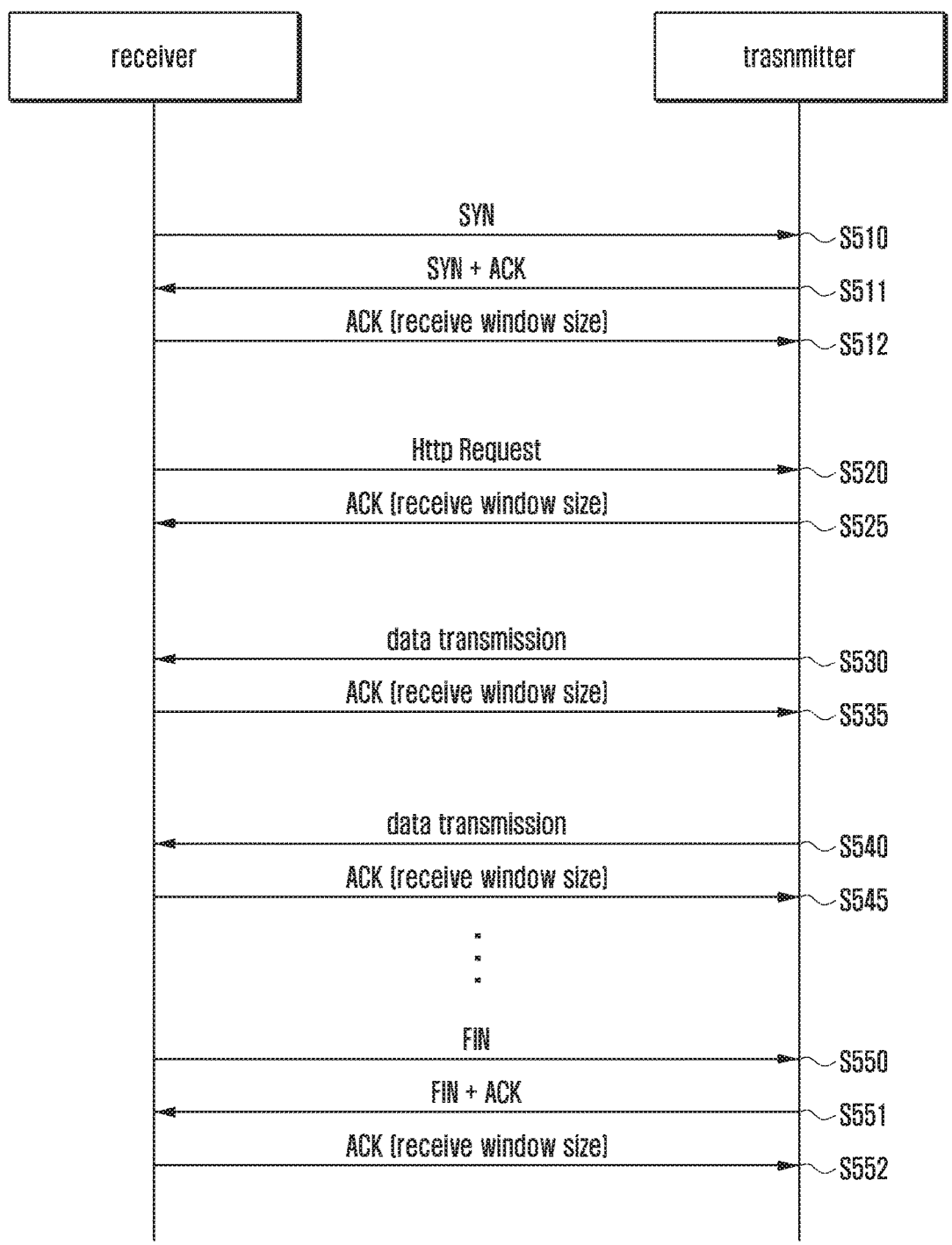
FIG. 5 is a flowchart illustrating a transmission control protocol (TCP) communication process of an electronic device according to various embodiments of the present disclosure.

FIG. 5 is a flowchart illustrating a TCP communication process of an electronic device according to various embodiments of the present disclosure.

Referring to FIG. 5, at operation S510, a receiver may transmit a synchronize (SYN) message to request TCP connection from a transmitter. In this embodiment, for convenience in explanation, the subject that downloads data is called a receiver, but the scope of the present disclosure is not limited thereto. In the case where the receiver transmits the data, it may be the transmitter.

At operation S511, the transmitter may transmit a response message to the connection request message. If the transmitter has successfully received the connection request message, the transmitter, at operation S511, may transmit a response message, which includes information included in the SYN message and an ACK, to the receiver.

If the response message has been successfully received, the receiver, at operation S512, may include an ACK in a response message to the received response message to transmit the response message. In this case, before transmitting the ACK, the receiver may include the receive window size, which means a data amount that can be received at a time, and the ACK in the response message to transmit the response message. Through the above-described process, the TCP connection may be established between the transmitter and the receiver.

After the TCP connection is established, the receiver, at operation S520, may transmit a message for requesting data transmission to the transmitter. For example, in the case of requesting web page related data, the receiver may transmit an http request.

If the request has been successfully received, the transmitter, at operation S525, may transmit the response message that includes the ACK and the receive window size to the receiver.

Further, at operation S530, the transmitter that has received the http request may transmit the data to the receiver in accordance with the request.

At operation S535, the receiver receives the data and transmits a corresponding response message to the transmitter. If the receiver has not received the data, it may include a NACK in the response message to transmit the response message, or may immediately retransmit the response message. In contrast, if the receiver has successfully received the data, it may include an ACK in the response message to transmit the response message. Further, if the receiver has successfully received the data, it may include the receive window size in the response message to transmit the response message. In the drawing, it is exemplified that the receiver has successfully received the data.

The transmitter that has received the response message may determine the transmit window size in consideration of the receive window size included in the response message, a congested window size of the transmitter, and the amount of data accumulated in a buffer. At this time, in the case of transmitting the data of which the amount is larger than the amount of data that the receiver can receive at a time, there is a high possibility of a data loss, and thus the transmitter may set the transmit window size to be smaller than the received receive window size.

Referring to FIG. 5, at operation S540, the transmitter may transmit the data in accordance with the determined transmit window size, and at operation S545, the receiver may receive the data and may transmit the response message, which includes the ACK and the receive window size, to the transmitter.

The receiver and the transmitter communicate with each other through repeatedly performing the above-described process, and if the data transmission is completed, the receiver, at operation S550, may transmit a FIN packet to the transmitter to release the connection with the transmitter.

At operation S551, the transmitter that has received this may accept the connection release request through transmission of a connection release acceptance message that includes the FIN packet and ACK information to the receiver.

At operation S552, the receiver that has received the connection release acceptance message may transmit a message that includes the ACK information indicating that the connection acceptance message has been successfully received to the transmitter. Through the above-described process, the TCP connection between the transmitter and the receiver can be released.

FIGS. 6A and 6B are diagrams illustrating a process in which an electronic device determines a receive window size according to various embodiments of the present disclosure.

Referring to FIGS. 6A and 6B, a receiver performs TCP connection establishment with a transmitter. A TCP connection establishment process is similar to operations S510 to S512 as described above with reference to FIG. 5, and thus explanation of the detailed contents thereof will be omitted.

According to various embodiments of the present disclosure, after the TCP connection establishment, the transmitter, at operation S610, may transmit TCP data to the receiver. At operation S611, the receiver that has received the TCP data may transmit a response message (hereinafter, it may be interchangeably used with the term "TCP ACK") that includes a receive window size to the transmitter.

In order to transmit the response message to the TCP data that is received before the receive window size is set, the receive window size may be stored in the receiver with a predetermined value. Accordingly, if the receive window size is not set, the receiver may include the stored receive window size in the response message to transmit the response message. Further, if the received window size reference value is not set, the receiver may set the pre-stored receive window size as the receive window size reference value.

According to various embodiments of the present disclosure, until the receiver sets the receive window size reference value, it may receive the TCP data plural times, and may include the preset receive window size in the corresponding TCP ACK to transmit the TCP ACK.

According to various embodiments of the present disclosure, the transmitter that has received the TCP ACK may increase the transmit window size up to the receive window size that is included in the TCP ACK. However, the transmit window size cannot exceed the receive window size, and in the present disclosure, a section in which the transmit window size is smaller than the receive window size may be called a first section, whereas a section after the transmit window size reaches the receive window size may be called a second section.

According to an embodiment of the present disclosure, at operation S620, the receiver may calculate a packet round trip time (RTT) of at least one packet that is received in the first section, and may determine the maximum value and the minimum value of the calculated packet RTT. The maximum value of the packet RTT that is determined in the first section may be called the RTT maximum value, and the minimum value of the packet RTT may be called a first RTT minimum value.

Thereafter, at operation S630, the receiver may determine whether the first section is ended, and if the first section is ended, at operation S640, the receiver may measure the packet RTT for at least one packet that is received for a time that is longer than the RTT maximum value that is determined in the first section. In this case, the minimum value of the packet RTT that is measured in the second section may be called the second RTT minimum value.

Further, the receiver may measure the packet RTT for a time that is longer than the RTT maximum value, and if a value that is smaller than a second RTT minimum value, the receiver may update the second RTT minimum value.

At operation S650, the receiver that has determined the first RTT minimum value and the second RTT minimum value may determine the receive window size reference value using the first RTT minimum value and the second RTT minimum value.

For example, the receiver may determine the receive window size reference value in accordance with a predetermined period or in the case where the second RTT minimum value is updated, and a method for determining the receive window size reference value will be described in detail below.

If the second RTT minimum value is determined, the receiver may determine whether a difference between the second RTT minimum value and the first RTT minimum value is within the preset critical value range.

If it is determined that the difference between the second RTT minimum value and the first RTT minimum value is included in the preset critical value range, the receiver may not change the receive window size reference value.

In contrast, if the difference between the second RTT minimum value and the first RTT minimum value exceeds the maximum value in the preset critical value range, the receiver may determine that a large receive window size reference value is set, and may decrease the receive window size reference value as large as a predetermined size.

Further, if the difference between the second RTT minimum value and the first RTT minimum value is smaller than the minimum value in the preset critical value range, the receiver may determine that a small receive window size reference value is set, and may increase the receive window size reference value as large as the predetermined size.

For example, the receive window size reference value may be increased/decreased in the unit of 500. Accordingly, if the receive window size reference value that is set in the receiver is 1000 and the difference between the second RTT minimum value and the first RTT minimum value exceeds the maximum value in the preset critical value range, the receiver may decrease the receive window size reference value to 500. In contrast, if the receive window size reference value that is set in the receiver is 1000 and the difference between the second RTT minimum value and the first RTT minimum value is smaller than the minimum value in the preset critical value range, the receiver may increase the receive window size reference value to 1500.

Thereafter, with reference to FIG. 6A, the receiver may determine the RTT minimum values in the first and second sections in accordance with the changed receive window size reference value, and may repeat a part or the whole of operations S620 to S640 until the difference between the first RTT minimum value and the second RTT minimum value is included in the preset critical value range.

Thereafter, the receiver may measure a new RTT minimum value in accordance with the increased receive window size reference value, and may repeat a part or the whole of operations S620 to S640 until the difference between the first RTT minimum value and the second RTT minimum value is included in the preset critical value range.

Through the above-described process, the receiver may set the receive window size reference value.

However, in the case of determining the receive window size using the packet round trip time (RTT) as described above, it is required to transmit the ACK and then to receive corresponding packets for measurement of the packet RTT. However, since the packet RTT is measured for a relatively long time, the above-described method has the problem that the receive window size cannot be dynamically changed in accordance with the network situation that is abruptly changed.

According to various embodiments of the present disclosure, the receiver dynamically determines the receive window size using the physical layer parameter. However, the physical layer parameter has the characteristic that it is abruptly changed by the network situation, and in the case of using only the physical layer parameter, a problem that the receive window size is abruptly changed may occur. Accordingly, in various embodiments of the present disclosure, the receive window size is determined in a manner that the receive window size reference value is set, and the set receive window size reference value is increased or decreased by a fixed value in accordance with the physical layer parameter.

According to an embodiment of the present disclosure, at operation S650, the AP that is included in the receiver may request the CP that is included in the receiver to transmit the channel status information in accordance with a predetermined period. In this case, the channel status information is information that is measured in a wireless link or a wireless channel, and may include a parameter that is measured on a physical layer (hereinafter referred to as "physical layer parameter").

In accordance with the above-described request, the CP may transmit the measured channel status information to the AP. According to an embodiment of the present disclosure, the channel information may include data throughput TP per hour, cell load measurement value, reference signal receive power (RSRP), reference signal receive quality (RSRQ), and receive signal strength indicator (RSSI).

At operation S660, the AP that has received the channel information may store the received channel information as a reference channel parameter if the received channel information is initial channel information. Further, the AP may store an average value of the received channel information as the reference channel parameter. The receiver may store and use the reference channel parameter to dynamically change the receive window size through comparison of the reference channel parameter with the measured physical channel parameter.

Thereafter, with reference to FIG. 6B, in the case of receiving the TCP data from the transmitter at operation S670 in a state where the receive window size reference value has been set at operation S650 (shown in FIG. 6A), the receiver, at operation S671, may include the set receive window size reference value in the TCP ACK as the receive window size to transmit the TCP ACK to the transmitter.

Further, at operation S680, the receiver may receive at least one piece of TCP data and may repeatedly perform the determination of the receive window size reference value. For example, the receiver may measure the packet round trip time (RTT) from the received TCP data, and if the minimum RTT value is updated, the receiver may repeatedly perform the determination of the receive window size reference value.

According to various embodiments of the present disclosure, if a predetermined period arrives again in order to request the channel status information, the AP of the receiver, at operation S690, may request the channel status information from the CP to receive the channel status information.

The channel status information is a parameter related to a wireless link or a wireless channel, and may be interchangeably used with the term "physical layer parameter".

At operation S695, the receiver that has acquired the physical layer parameter may dynamically determine the receive window size using the set receive window size reference value and the physical layer parameter.

For example, if the receive window size reference value is set to 1500, the receiver may determine the receive window size by increasing/decreasing the receive window size reference value in the unit of 100 in accordance with the physical layer parameter.

Determination of the receive window size using the physical layer parameter will be described in detail later.

Thereafter, the receiver may dynamically determine the receive window size through repetition of the above-described process, and may effectively increase the data throughput (TP) per hour of the TCP transmission through the above-described process.

Further, if an event, such as handover or path change, occurs, the receiver may repeatedly perform the above-described process for determining the receive window size.

Figure 7A:
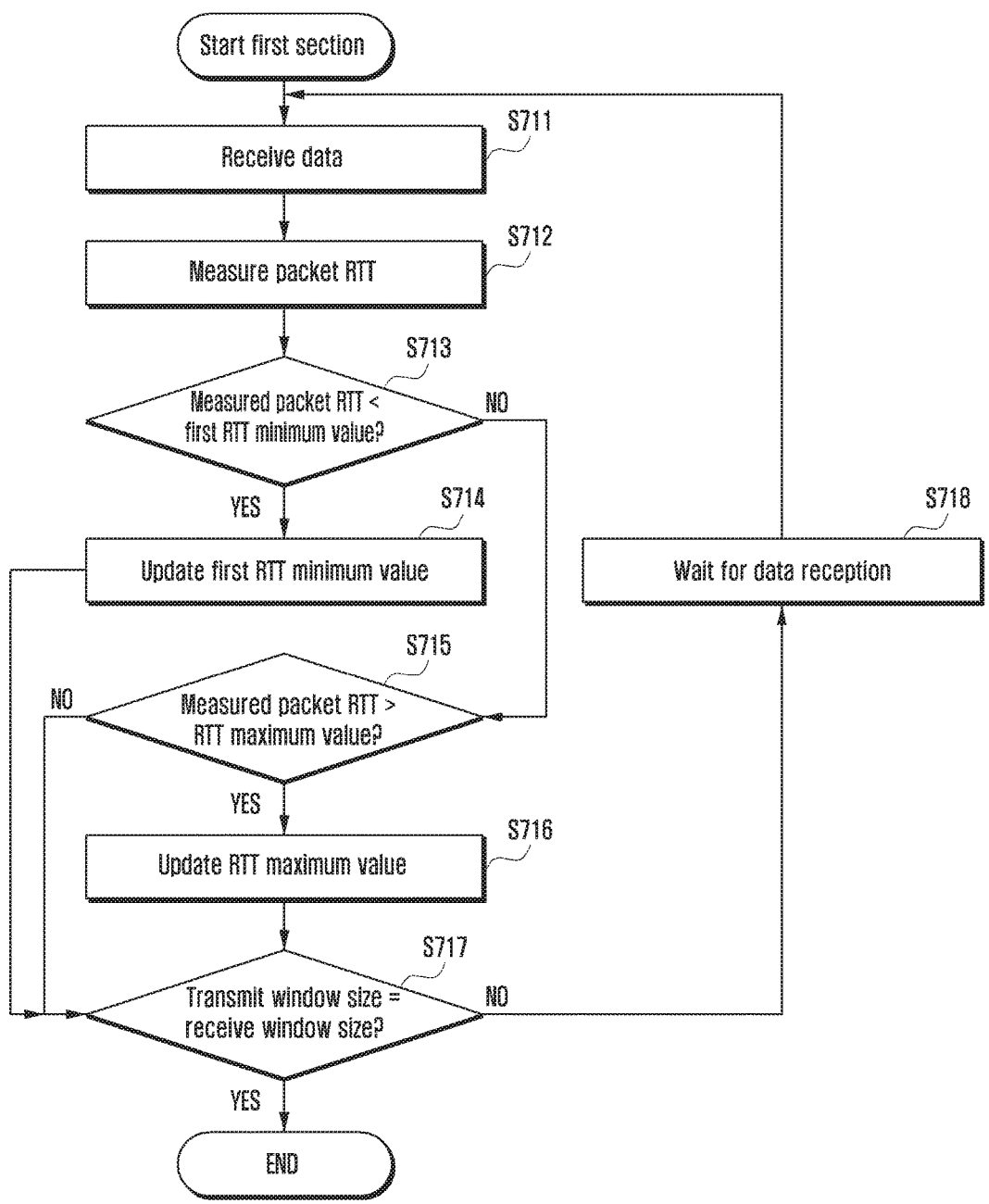
Figure 7B:
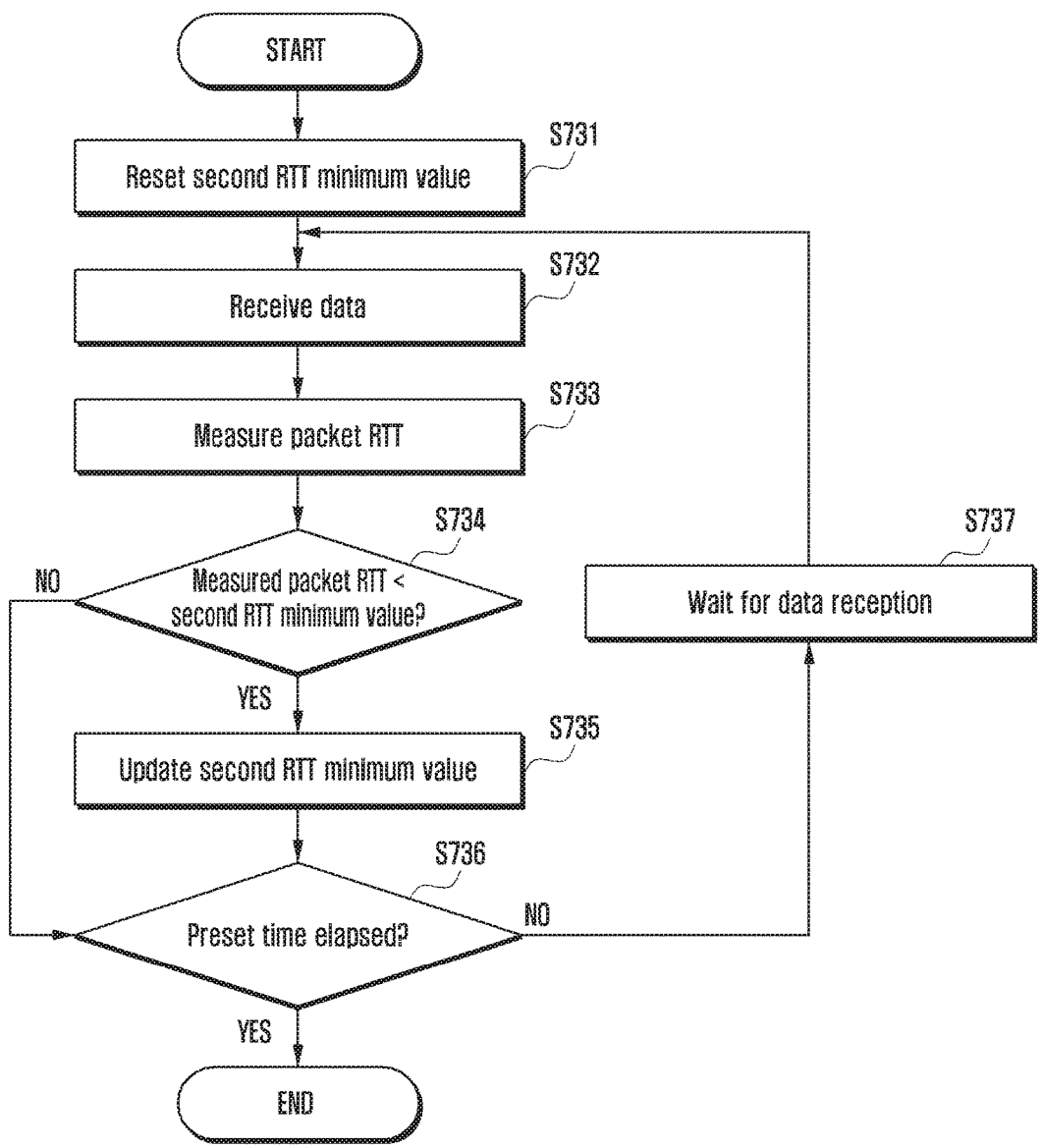
Figure 7C:
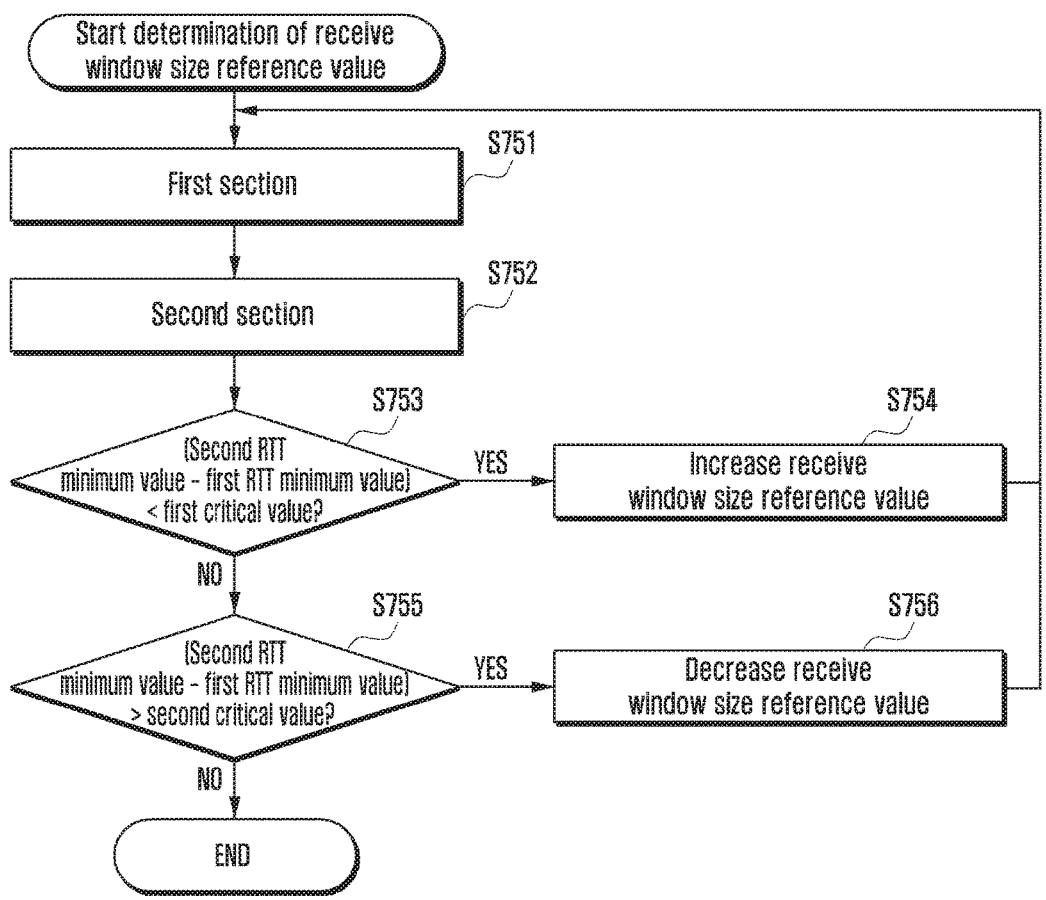

FIGS. 7A, 7B, and 7C are diagrams illustrating a process of determining a receive window size reference value of an electronic device according to various embodiments of the present disclosure.

FIG. 7A is a diagram illustrating a process of determining an RTT maximum value and a first RTT minimum value in a first section of an electronic device according to various embodiments of the present disclosure.

Referring to FIG. 7A, an electronic device according to various embodiments of the present disclosure may receive data at operation S711, and may measure a packet round trip time (RTT) using the received data at operation S712.

Further, at operation S713, the electronic device may determine whether the measured packet RTT is smaller than the first RTT minimum value. If it is determined that the measured packet RTT is smaller than the first RTT minimum value, the electronic device, at operation S714, may update the first RTT minimum value to the measured packet RTT. Further, at operation S717, the electronic device may determine whether a transmit window size is equal to a receive window size.

In contrast, if it is determined that the measured packet RTT is larger than the first RTT minimum value, the electronic device, at operation S715, may determine whether the measured packet RTT is larger than the RTT maximum value. If it is determined that the measured packet RTT is larger than the RTT maximum value, the electronic device, at operation S716, may update the RTT maximum value to the measured packet round trip time (RTT).

Thereafter, at operation S717, the electronic device may determine whether the transmit window size is equal to the maximum value of the receive window size. If the transmit window size does not reach the value of the receive window size, the electronic device, at operation S718, may wait for reception of another piece of data.

In contrast, if second window size is equal to the receive window size, the electronic device may interrupt the packet RTT measurement in the first section and may enter into the second section.

FIG. 7B is a diagram illustrating a process of determining a second RTT minimum value in a second section according to various embodiments of the present disclosure.

Referring to FIG. 7B, at operation S731, the electronic device that has entered into the second section may reset the second RTT minimum value.

The electronic device according to various embodiments of the present disclosure may receive data at operation S732, and may measure the packet RTT using the received data at operation S733.

Then, at operation S734, the electronic device may determine whether the measured packet RTT is smaller than the second RTT minimum value. If it is determined that the measured packet RTT is smaller than the second RTT minimum value, the electronic device, at operation S735, may update the second RTT minimum value to the measured packet RTT. However, in the case of receiving initial data after resetting the second RTT minimum value, the electronic device may omit the operation S734, and may set the measured packet RTT to the second RTT minimum value.

Thereafter, at operation S736, the electronic device may determine whether a preset time has elapsed. The preset time may be set to a time that is longer than the determined RTT maximum value in FIG. 7A.

If it is determined that the preset time has not elapsed, the electronic device, at operation S737, may wait for the reception of next data.

In contrast, if it is determined that the preset time has elapsed, the electronic device may end the packet RTT measurement in the second section, and may perform determination of the receive window size reference value.

FIG. 7C is a diagram illustrating a process in which an electronic device determines a receive window size reference value according to various embodiments of the present disclosure.

Referring to FIG. 7C, at operations S751 and S752, the electronic device may determine the first RTT minimum value and the second RTT minimum value through the first section and the second section. This process is the same as that described with reference to FIGS. 7A and 7B, and thus the detailed explanation thereof will be omitted.

According to an embodiment of the present disclosure, the electronic device, at operation S753, may determine whether the difference between the determined second RTT minimum value and the first RTT minimum value is included in the preset critical value range.

For example, if it is assumed that the minimum value and the maximum value in the preset critical value range are the first critical value and the second critical value, the electronic device, at operation S753, may determine whether the difference between the second RTT minimum value and the first RTT minimum value is smaller than the first critical value. If it is determined that the difference between the second RTT minimum value and the first RTT minimum value is smaller than the first critical value, the electronic device may determine that it is in a state where it cannot sufficiently use the channel (hereinafter referred to as "under-utilization state"). The under-utilization state may mean a case where data transmission/reception amount is small in comparison to the channel situation.

Accordingly, if it is determined that the difference between the second RTT minimum value and the first RTT minimum value is smaller than the first critical value, the electronic device, at operation S754, may increase the receive window size reference value. In the case of increasing the receive window size reference value as described above, the transmitter may increase the amount of data packet that is transmitted at a time through increasing the transmit window size, and may increase the data throughput (TP) per hour.

In contrast, if it is determined that the difference between the second RTT minimum value and the first RTT minimum value is not smaller than the first critical value, the electronic device, at operation S755, may determine whether the difference between the second RTT minimum value and the first RTT minimum value is larger than the second critical value.

If the difference between the second RTT minimum value and the first RTT minimum value is larger than the second critical value, the electronic device may determine that it is in a state where it excessively uses the channel (hereinafter referred to as "over-utilization state"). The over-utilization state may mean a case where data transmission/reception amount is large in comparison to the channel situation.

Accordingly, if it is determined that the difference between the second RTT minimum value and the first RTT minimum value is larger than the second critical value, the electronic device, at operation S756, may decrease the receive window size reference value. In the case of decreasing the receive window size reference value as described above, the transmitter may decrease the amount of data packet that is transmitted at a time through decreasing the transmit window size, and may decrease the packet round trip tome.

Thereafter, the electronic device may return to operation S751 to determine the packet round trip time (RTT) minimum value in the first section and the second section, and may repeatedly perform the above-described process until the difference between the second RTT minimum value and the first RTT minimum value is included in the critical value range.

If the difference between the second RTT minimum value and the first RTT minimum value is included in the critical value range through the above-described process, the electronic device may set the receive window size whereby the difference between the second RTT minimum value and the first RTT minimum value is included in the critical value range to the receive window size reference value.

Figure 8A:
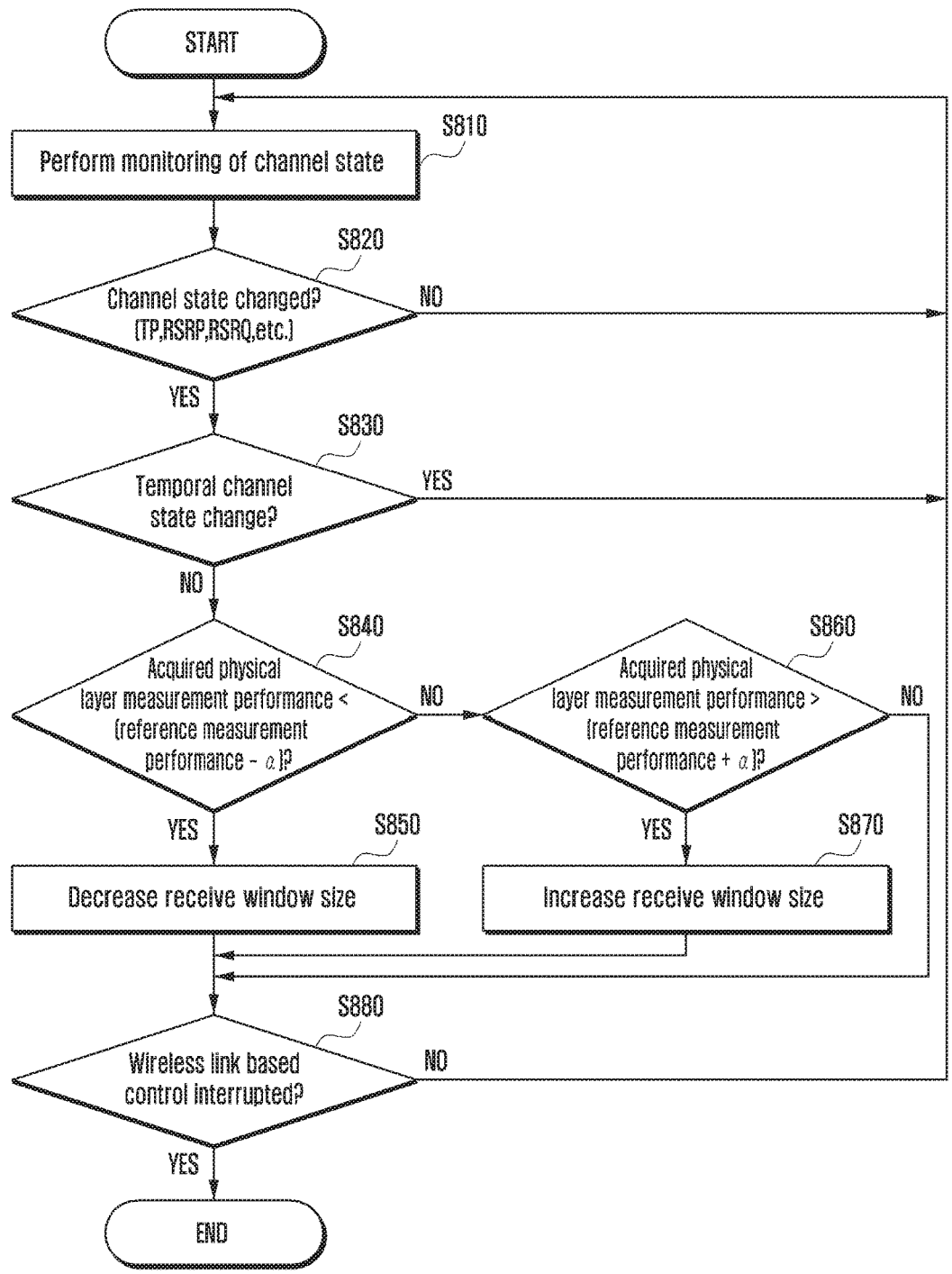
FIGS. 8A and 8B are flowcharts illustrating a process in which an electronic device determines a receive window size using a physical layer parameter according to various embodiments of the present disclosure.

FIG. 8A is a flowchart illustrating a process in which an electronic device determines a receive window size using the physical layer measurement performance according to various embodiments of the present disclosure.

Referring to FIG. 8A, the electronic device may calculate the packet round trip time (RTT) for the received data. Further, the electronic device may set the receive window size reference value using the calculated packet RTT.

If the minimum value of the packet RTT is updated, the electronic device may reset the receive window size reference value in a preset period or when the channel state is abruptly changed.

Further, at operation S810, the electronic device may monitor the channel state at operation S810. Specifically, the CP that is included in the electronic device may measure the channel status information by continuously monitoring the channel state, and the AP that is included in the electronic device may request and receive the channel status information in accordance with the predetermined period.

The channel status information may include, for example, data throughput (TP) per hour, cell load measurement value, reference signal receive power (RSRP), reference signal receive quality (RSRQ), and receive signal strength indicator (RSSI).

The channel status information is information that is measured in a wireless link or a wireless channel, and may include a physical layer parameter.

At operation S820, the electronic device that has acquired the channel status information may determine whether the channel state has been changed using the acquired channel status information.

According to an embodiment of the present disclosure, the electronic device may set the channel status information when the receive window reference value is set as the reference channel parameter. Further, the electronic device may store an average value for a predetermined time of the received channel status information as the reference channel parameter.

Accordingly, the electronic device may determine whether the channel state has been changed through comparison of the acquired physical layer parameter with the reference channel parameter. For example, whether the channel state has been changed may be determined through determination of whether the difference between the acquired physical layer parameter and the reference channel parameter exceeds the preset critical value.

If it is determined that the channel state has not been changed as the result of the determination, the electronic device may return to operation S810 to monitor the channel state.

Even if it is determined that the channel state has been changed as the result of the determination, the data transmission rate that is measured in the channel may be decreased even in the case where no data is received from a server, and thus the electronic device may receive and determine whether TCP data is continuously transmitted in a TCP flow.

Referring to FIG. 8A, if the TCP data is not continuously transmitted as the result of the determination, it is not required to change the receive window size, and the electronic device may return to operation S810 to monitor the channel state.

In contrast, if the channel state has been changed and the TCP data is continuously transmitted, the electronic device, at operation S830, may identify whether the change of the channel state is temporary. If it is determined that the change of the channel state is temporary, the electronic device may not change the receive window size, but may return to operation S810 to continuously monitor the channel state until the channel state is stabilized.

In contrast, if it is determined that the change of the channel state is not temporary, the electronic device may perform a process for changing the receive window size.

For example, if it is determined that the change of the channel state is caused by the change of cell loading, the electronic device may determine that the change of the channel state is not temporary, and may perform a process for changing the receive window size.

For example, in order to determine whether the change of the channel state is caused by the change of the cell loading, the electronic device may calculate the data throughput (TP) per hour through observing an allocated modulation and coding scheme (MCS) level, the size of resource block (RB), and an amount that is allocated for a predetermined time. Specifically, the electronic device may calculate the data TP per hour by calculating the amount of data that is transmitted for 1 ms sub frame using the MCS level, the RB information, and a transmission block size table, and observing the amount that is actually allocated for 100 ms.

Further, the electronic device may calculate a parameter r that indicates correlation between received signals using the acquired RSRP and RSSI through Equation 1 below.

$$r = \frac{n(\sum xy) - (\sum x)(\sum y)}{\sqrt{[n\sum x^2 - (\sum x)^2][n\sum y^2 - (\sum y)^2]}} \quad \text{Equation 1}$$

In this case, x denotes RSRP, y denotes RSSI, and n denotes the number of samples. If the parameter r has a high value, RSRP and RSSI have high correlation, and RSRP and RSSI may be changed in a similar form. In contrast, if the parameter r has a low value, RSRP and RSSI have low correlation, and RSRP and RSSI may be independently changed.

If the data throughput (TP) per hour is decreased, the electronic device may determine whether the parameter r is larger than a predetermined critical value.

If it is determined that the parameter r is larger than the critical value, RSRP and RSSI have high correlation, which means that inter-cell interference is not high, and thus the electronic device may determine that the decrease of the data TP per hour is caused by the cell loading. Accordingly, the electronic device may determine that the change of the channel state is not temporary and may proceed with the subsequent process.

In contrast, if it is determined that the parameter r is smaller than the critical value, RSRP and RSSI have low correlation, which means that inter-cell interference is high, and thus the electronic device may determine that the data TP per hour is caused by the inter-cell interference. Accordingly, the electronic device may determine that the change of the channel state is temporary and may return to operation S810 to receive the data.

The above-described contents are illustrative in order to determine whether the change of the channel state is temporary, and the electronic device may determine whether the change of the channel state is temporary through various methods.

If it is determined that the change of the channel state is not temporary, the electronic device may determine whether to decrease the receive window size through comparison of the reference measurement performance with the physical layer measurement performance.

Specifically, the electronic device may determine the reference measurement performance using the reference channel parameter, and may determine the physical layer measurement performance using the physical layer parameter. For example, the electronic device may determine the reference measurement performance using the data throughput (TP) per hour that is stored as the reference channel parameter, and may determine the physical layer performance using the data TP per hour that is measured by the CP. Further, the electronic device may determine the reference measurement performance using RSSI and RSRP stored as the reference channel parameter, and may determine the physical layer measurement performance using RSSI and RSRP acquired as the physical layer parameter.

Accordingly, at operation S840, the electronic device may determine whether a value that is obtained by subtracting the preset value from the determined reference measurement performance exceeds the acquired physical layer measurement performance.

If the acquired physical layer measurement performance is smaller than the value as the result of the determination, the electronic device, at operation S850, may set a value that is obtained by decreasing the set receive window size reference value by a predetermined size as the receive window size.

In contrast, if the physical layer measurement performance is larger than the value, the electronic device, at operation S860, may determine whether a value that is obtained by adding a preset value to the reference measurement performance is smaller than the acquired physical layer measurement performance.

If the acquired physical layer measurement performance is larger than the value as the result of the determination, the electronic device, at operation S870, may set a value that is obtained by increasing the set receive window size reference value by a predetermined size as the receive window size.

If the receive window size is dynamically controlled or if the physical layer measurement performance is smaller than the value as the result of the determination at operation S860, the electronic device, at operation S880, may determine whether to interrupt wireless link based control.

If it is determined not to interrupt the control, the electronic device, at operation S810, monitors the channel state, whereas if it is determined to interrupt the control, the electronic device ends the TCP control process.

Figure 8B:
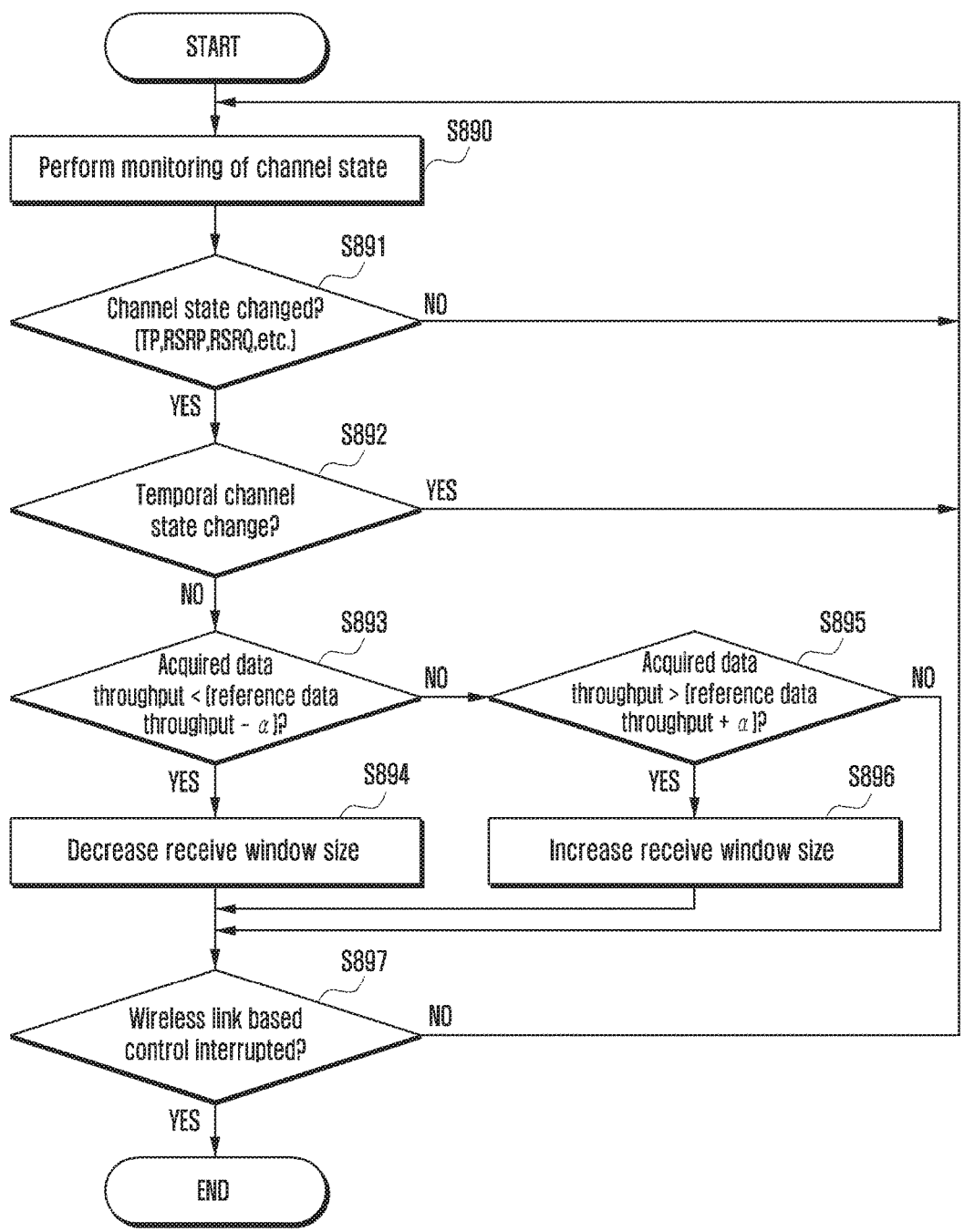

FIG. 8B is a flowchart illustrating a process in which an electronic device determines a receive window size using data throughput (TP) per hour according to various embodiments of the present disclosure.

Referring to FIG. 8B, the electronic device, at operation S890, may monitor the channel state. The AP that is included in the electronic device may request and receive the channel status information in accordance with the predetermined period, and the electronic device may determine whether the channel state has been changed using the channel status information that is acquired at operation S891.

If it is determined that the channel state has been changed, the electronic device, at operation S892, may determine whether the change of the channel state is temporary.

Since operations S891 to S892 are the same as operations S810 to S830 shown in FIG. 8A, the detailed explanation thereof will be omitted.

If it is determined that the channel state is not temporary, the electronic device may determine whether to increase the receive window size through comparison of the physical layer measurement performance with the reference measurement performance. Specifically, the electronic device may dynamically control the receive window size using the acquired physical layer parameter and the stored reference channel parameter.

The reference channel parameter and the physical layer parameter may include data throughput (TP) per hour, cell load measurement value, reference signal receive power (RSRP), reference signal receive quality (RSRQ), and receive signal strength indicator (RSSI), and the electronic device may determine whether to increase the receive window size using at least one of the above-described parameters.

In this embodiment, it is exemplified that whether to increase the receive window size is determined using the data TP per hour, but the scope of the present disclosure is not limited thereto.

The electronic device may determine whether the data TP per hour included in the physical layer parameter that is acquired at operation S893 (hereinafter, it may be called the "acquired data throughput per hour") is smaller than a value that is obtained by subtracting a preset value from the data TP per hour included in the reference channel parameter (hereinafter, it may be called the "reference data throughput per hour").

If the acquired data TP per hour is smaller than the value that is obtained by subtracting the preset value from the reference data TP per hour as the result of the determination, the electronic device, at operation S895, may decrease the receive window size reference value and may set the decreased value as the receive window size.

In contrast, if the acquired data TP per hour is larger than the value that is obtained by subtracting the preset value from the reference data TP per hour as the result of the determination, the electronic device, at operation S895, may determine whether the acquired data throughput per hour is larger than the value that is obtained by adding the present value to the reference data TP per hour.

If the acquired data TP per hour is larger than the value that is obtained by adding the present value to the reference data TP per hour as the result of the determination, the electronic device, at operation S896, may increase the receive window size reference value, and may set the increased value as the receive window size.

After the receive window size is dynamically controlled or if acquired data throughput (TP) per hour is smaller than the value that is obtained by adding the preset value to the reference data TP per hour as the result of the determination at operation S895, the electronic device, at operation S897, may determine whether to interrupt wireless link based control.

If it is determined not to interrupt the control, the electronic device, at operation S890, monitors the channel state, whereas if it is determined to interrupt the control, the electronic device ends the TCP control process.

Figure 9:
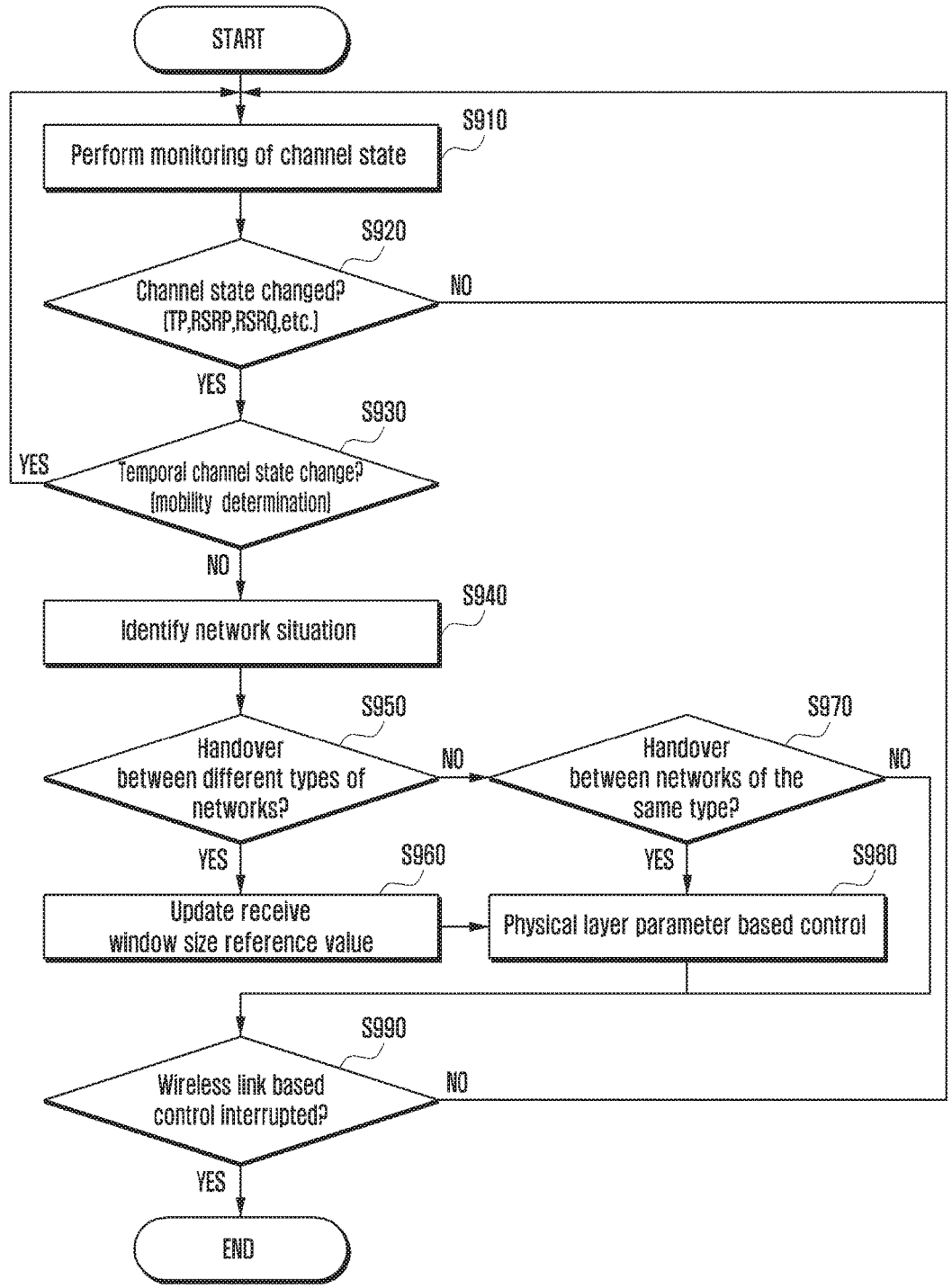
FIG. 9 is a flowchart illustrating another process in which an electronic device determines a receive window size using a physical layer parameter according to various embodiments of the present disclosure.

FIG. 9 is a flowchart illustrating another process in which an electronic device determines a receive window size using a physical layer parameter according to various embodiments of the present disclosure.

Referring to FIG. 9, the electronic device, at operation S910, may monitor the channel state. At operation S920, the electronic device that has acquired the channel status information may determine whether the channel state has been changed using the acquired channel status information. The above-described process is similar to the contents as described at operations S810 to S820 shown in FIGS. 8A and 8B, and thus the detailed explanation thereof will be omitted.

If it is determined that the channel state has not been changed as the result of the determination, the electronic device may return to operation S910 to monitor the channel state.

In contrast, if it is determined that the channel state has been changed, the electronic device, at operation S930, may identify whether the change of the channel state is temporary. In this embodiment, in order to identify whether the change of the channel state is temporary, mobility of the electronic device is determined.

For example, a sensor or a CP included in the electronic device may determine mobility of the electronic device using an acceleration sensor.

If it is determined that the electronic device is moving as the result of the determination, there is high possibility that the channel state is changed abruptly or occasionally, and thus there is high possibility that the receive window size is also changed abruptly. Accordingly, the electronic device does not change the receive window size, but may return to operation S910 to continuously monitor the channel state until the channel state is stabilized. Further, the electronic device may dynamically control the receive window size using only the physical layer parameter.

In contrast, if it is determined that the electronic device is not moving, the electronic device, at operation S940, may identify the network situation. According to an embodiment of the present disclosure, the electronic device, at operation S940, may determine whether handover occurs between different types of networks or networks of the same type using signaling with a base station.

Through observation of specific signaling with the base station, the electronic device, at operation S950, may determine whether handover between different types of networks has been performed. For example, the electronic device may determine whether handover between different types of networks has been performed using a message including a handover command that is received from the base station. If the handover between different types of networks has been performed, the network characteristic, such as bandwidth, is changed, and thus it is required for the electronic device to reset the receive window size reference value. Accordingly, at operation S960, the electronic device may update the receive window size reference value.

In this case, the electronic device may set the receive window size reference value to a predetermined value in accordance with the network characteristic. Further, the electronic device may set the receive window size reference value using the packet round trip time (RTT) as described above after setting the receive window size reference value to the predetermined value.

Further, at operation S980, the electronic device may control the receive window size based on the wireless link (based on the physical layer parameter) after updating the receive window size reference value.

For example, if handover has been performed from a 3G network to an LTE network, the electronic device may set the receive window size reference value to 1500 that is a predetermined value. Further, the electronic device may set the receive window size reference value using the RTT minimum value in the first section and the second section after setting the receive window size reference value to 1500 that is a predetermined value. The electronic device that has set the receive window size reference value may determine the receive window size by increasing/decreasing the receive window reference value that is determined with reference to the physical layer parameter in the unit of 100.

In contrast, with reference to FIG. 9, if it is determined that the handover between different types of networks has not been performed at operation S950, the electronic device determines whether handover between networks of the same type has been performed at operation S970. If the handover between networks of the same type is not performed, the electronic device does not have mobility and a cell (location) has not been changed. Accordingly, the electronic device may return to operation S910 to monitor the channel state without changing the receive window size.

In contrast, if the handover between networks of the same type is performed, the electronic device, at operation S980, may control the receive window size based on the wireless link. That is, the electronic device may dynamically control the receive window size using the physical layer parameter related to the wireless link (or wireless channel).

In the case where the handover between networks of the same type is performed, the network characteristic is not greatly changed, and thus the electronic device may dynamically control the receive window size through the channel state that is determined through the physical layer parameter while maintaining the receive window size reference value. However, even in the case where the handover between networks of the same type is performed, the network characteristic may be changed due to the cell change, and in such a case, the electronic device may reset the receive window size reference value.

Thereafter, at operation S990, the electronic device may determine whether to interrupt the wireless link based control. Specifically, if it is determined that neither of the handover between networks of the same type and the handover between different types of networks has been performed, or after the handover between networks of the same type or the handover between different types of networks occurs and the receive window size is dynamically controlled on the basis of the physical layer parameter, the electronic device may determine whether to interrupt the wireless link based control.

If it is determined not to interrupt the control, the electronic device, at operation S910, monitors the channel state, whereas if it is determined to interrupt the control, the electronic device may end the TCP control process.

According to an embodiment of the present disclosure, the electronic device may adjust the receive window size through a process below.

Figure 10:
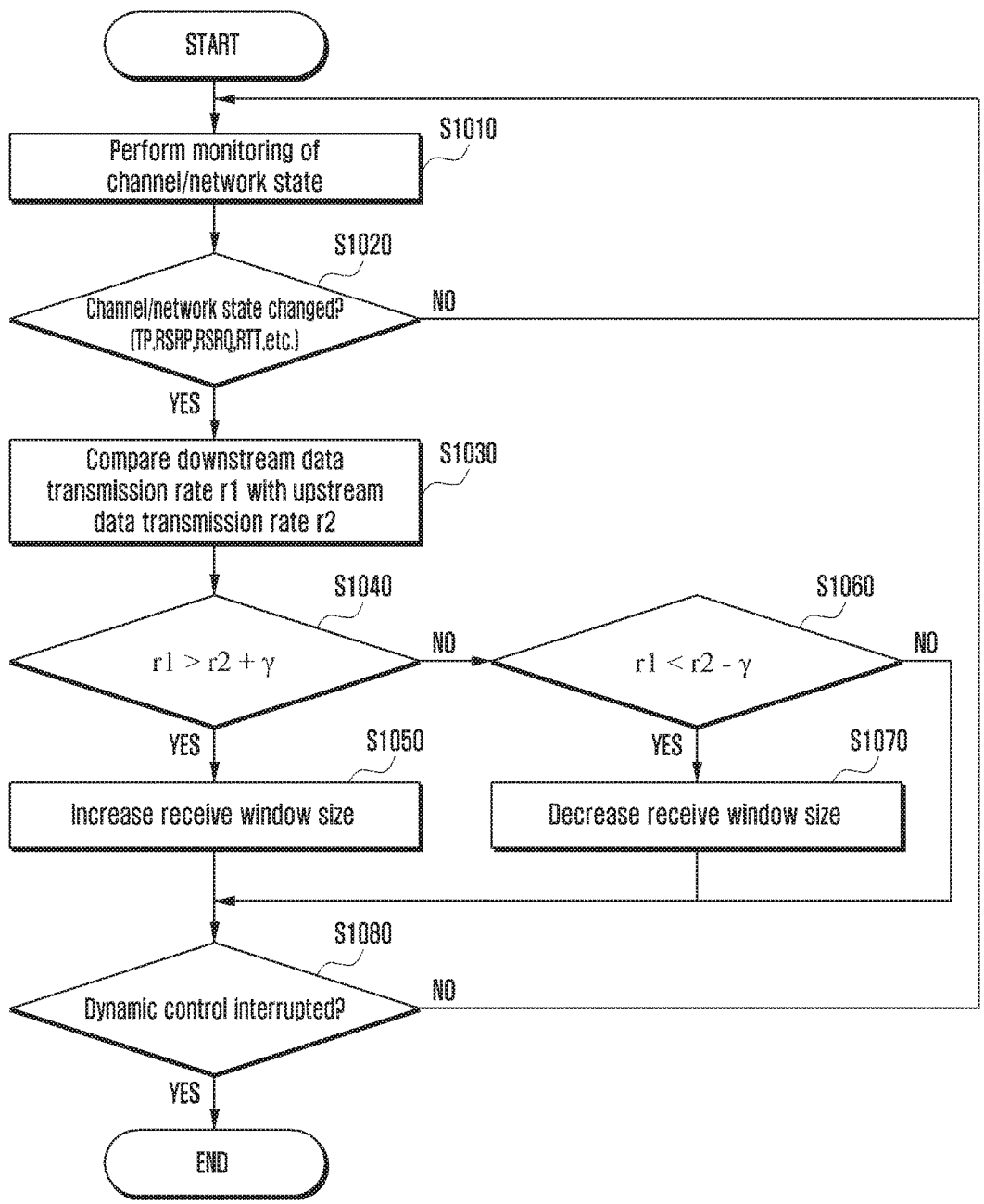
FIG. 10 is a flowchart illustrating still another process in which an electronic device determines a receive window size using a physical layer parameter according to various embodiments of the present disclosure.

FIG. 10 is a flowchart illustrating still another process in which an electronic device determines a receive window size using a physical layer parameter according to various embodiments of the present disclosure.

Referring to FIG. 10, the electronic device, at operation S1010, may monitor the channel state. At operation S1020, the electronic device that has acquired the channel status information may determine whether the channel state or the network state has been changed using the acquired channel information. The above-described process is similar to the contents as described at operations S810 to S820 of FIGS. 8A and 8B, and thus the detailed explanation thereof will be omitted.

If it is determined that the channel state has not been changed as the result of the determination, the electronic device may return to operation S1010 to monitor the channel state.

In contrast, if it is determined that the channel state has been changed, the electronic device, at operation S1030, calculates and compares r1 that means a downstream data transmission rate between a base station and a terminal and r2 that means an upstream data transmission rate between a server and the base station with each other. The difference between r1 and r2 may mean a buffering degree in the base station, and the electronic device may determine whether to increase the receive window size through comparison of r1 with r2.

In this case, a method for calculating r1 and r2 is as follows.

According to an embodiment of the present disclosure, r1 may mean the data reception rate of the base station, and may be calculated by Equation 2 below.

$$R2 = k * mss / Tin \qquad \text{Equation 2}$$

In this case, k may mean the number of packets when an ACK is transmitted. The k value may mean the transmit window size, and may be estimated by the electronic device through a predetermined algorithm.

Further, mss means a maximum segment size (MSS), and may mean the size of one data packet. The mss value may be included in SYN that is transmitted when the TCP connection protocol is established.

Further, Tin means the time for which data that is transmitted by a server in accordance with an ACK that is transmitted by a terminal reaches a base station, and may mean a value that is obtained by subtracting 1/r1 from the first RTT minimum value.

After the above-described calculation, the electronic device may determine the receive window size through comparison of the calculated r1 and r2 with each other.

Specifically, at operation S1040, the electronic device may determine whether r1 is larger than a value that is obtained by adding a predetermined value to r2.

If it is determined that r1 is larger than the value that is obtained by adding the predetermined value to r2, the data transmission rate that the base station transmits to the terminal becomes high, and the electronic device, at operation S1050, may set a value that is obtained by increasing the set receive window size reference value by a predetermined size as the receive window size.

In contrast, if it is determined that r1 is not larger than the value that is obtained by adding the predetermined value to r2, the electronic device, at operation S1060, may determine whether r1 is smaller than a value that is obtained by subtracting a predetermined value from r2.

If it is determined that r1 is smaller than the value that is obtained by subtracting the predetermined value from r2, the data transmission rate that the base station transmits to the terminal becomes low, and the electronic device, at operation S1070, may set the value that is obtained by subtracting the predetermined value from the set receive window size reference value as the receive window size.

In this case, the set receive window size reference value may be set using the packet round trip time (RTT) for the data that is received by the electronic device, and the detailed contents thereof are as described above.

Further, the receive window size reference value may be reset when the minimum value of the packet RTT is updated, in a preset period, or when the channel state is abruptly changed.

Further, if the receive window size reference value has not been set after the TCP connection, the electronic device may use a pre-stored value as the receive window size reference value.

At operation S1060, if r1 is larger than the value that is obtained by subtracting the predetermined value from r2 as the result of the determination, or after the receive window size is dynamically controlled, the electronic device, at operation S1080, may determine whether to interrupt the dynamic control.

If it is determined not to interrupt the control, the electronic device, at operation S1010, monitors the channel state, whereas if it is determined to interrupt the control, the electronic device ends the TCP control process.

Various embodiments of the present disclosure disclose a method for controlling a transmission control protocol (TCP) of an electronic device may include setting a receive window size reference value based on a measured packet round trip time (RTT), identifying a physical layer parameter related to a wireless channel of another electronic device that is different from the electronic device, determining the receive window size based on the physical layer parameter and the receive window size reference value, and transmitting the determined receive window size to the other electronic device during transmission of a response message in accordance with data reception.

According to various embodiments of the present disclosure, the physical layer parameter may be related to a wireless channel.

According to various embodiments of the present disclosure, the physical layer parameter may include throughput (TP) per hour, reference signal receive power (RSRP), reference signal receive quality (RSRQ), and receive signal strength indicator (RSSI).

According to various embodiments of the present disclosure, the method for controlling a TCP of an electronic device may further include increasing or decreasing the set receive window size reference value in accordance with the physical layer parameter.

According to various embodiments of the present disclosure, the method for controlling a TCP of an electronic device may include decreasing the set receive window size reference value if the physical layer measurement performance has a value that is smaller than a minimum value in a preset reference channel measurement performance range; and increasing the set receive window size reference value if the physical layer measurement performance has a value that exceeds a maximum value in the preset reference channel measurement performance range.

According to various embodiments of the present disclosure, the method for controlling a TCP of an electronic device may include determining the receive window size based on at least one of terminal mobility related information and handover related information.

According to various embodiments of the present disclosure, the method for controlling a TCP of an electronic device may include determining the receive window size based on a data transmission rate between the terminal and the base station and a data transmission rate between the base station and a server.

According to various embodiments of the present disclosure, the method for controlling a TCP of an electronic device may include increasing the receive window size reference value if a difference between an RTT minimum value that is measured in a first section and an RTT minimum value that is measured in a second section exceeds a maximum value in a preset range; and decreasing the receive window size reference value if the difference between the RTT minimum value that is measured in the first section and the RTT minimum value that is measured in the second section is smaller than a minimum value in the reset range.

According to various embodiments of the present disclosure, the electronic device can dynamically control the receive window size, and thus can obtain maximum data throughput (TP) per hour during file download or streaming. Further, since the electronic device dynamically controls the receive window size, it can reduce the packet round trip time (RTT) and increase the data TP per hour when executing an application, such as video call, in which the packet RTT is important. Further, the electronic device can reduce memory waste that occurs in the case where the receive window size is set to be unnecessarily large.

Further, since the electronic device dynamically controls the receive window size, it can reduce the packet RTT while maintaining the data TP per hour in the case where the server is located relatively far apart from the electronic device.

In contrast, since the electronic device dynamically controls the receive window size, it can increase the data TP per hour while maintaining the packet RTT in the case where the server is located relatively far apart from the electronic device.

The term "module", as used in the description of the present disclosure, may mean a unit that includes, for example, one of hardware, software, and firmware, or a combination of two or more thereof. The "module" may be interchangeably used, for example, with the term, such as unit, logic, logical block, component, or circuit. The "module" may be the minimum unit or a part of a component integrally formed. The "module" may be the minimum unit or a part thereof that performs one or more functions. The "module" may be mechanically or electronically implemented. For example, the "module" according to various embodiments of the present disclosure may include at least one of an application-specific integrated Circuit (ASIC) chip, field programmable gate arrays (FPGAs) or a programmable logic device, which has been known or is to be developed, to perform certain tasks.

According to various embodiments, at least a part of devices (e.g., modules or their functions) or methods (e.g., operations) according to various embodiments of the present disclosure may be implemented by instructions that are stored in a computer readable storage medium in the form of programming modules. In the case where the instructions are executed by one or more processors (e.g., processors 120), the one or more processors may perform functions corresponding to the instructions. The computer readable storage medium may be, for example, the storage module 130.

The computer readable recording medium may include a magnetic medium, such as a hard disc, a floppy disc, or a magnetic tape, an optical medium, such as a compact disc read only memory (CD-ROM) or a digital versatile disc (DVD), a magneto-optic medium, such as a floptical disk, or a hardware device specially configured to store and perform program commands (e.g., programming modules), such as a read only memory (ROM), a random access memory (RAM), or a flash memory. Further, examples of program instructions may include not only machine language codes made by a compiler but also high-class language codes that can be executed by a computer using an interpreter or the like. The above-described hardware device may be configured to operate as one or more software modules for performing the operations according to various embodiments of the present disclosure, and vice versa.

The module or programming module according to various embodiments of the present disclosure may include one or more of the above-described constituent elements, a part thereof may be omitted, or other additional constituent elements may be further included therein. The operations that are performed by the module according to various embodiments of the present disclosure, the programming module, or other constituent elements may be performed in a successive, parallel, repetitive, or heuristic manner. Further, some operations may be executed in a different order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A first electronic device for controlling a transmission control protocol (TCP), the first electronic device comprising:
   a communication circuit;
   a processor electrically connected to the communication circuit; and
   a memory electrically connected to the processor,
   wherein the memory stores instructions for the processor,
   wherein the processor is configured to:
      set a receive window size reference value based on a measured packet round trip time (RTT),
      identify first channel information related to a wireless channel of the first electronic device,
      determine a receive window size based on the first channel information, second channel information associated with the receive window size reference value, and the receive window size reference value, and
      transmit the determined receive window size to a second electronic device,
      wherein the determined receive window size is determined based on the receive window size reference value when a difference between the first channel information and the second channel information is greater than a threshold.

2. The first electronic device of claim 1, wherein the processor is further configured to identify the second channel information based on a predetermined period.

3. The first electronic device of claim 1, wherein the first channel information and the second channel information comprise at least one of data throughput, reference signal receive power, reference signal receive quality, or a receive signal strength indicator.

4. The first electronic device of claim 2, wherein the processor is further configured to increase or decrease the set receive window reference value based on the second channel information and the first channel information.

5. The first electronic device of claim 4, wherein the processor is further configured to:
   decrease the set receive window size reference value if the first channel information has a value that is smaller than a minimum value of a range of the second channel information, and
   increase the set receive window size reference value if the first channel information has a value that exceeds a maximum value of the range of the second channel information.

6. The first electronic device of claim 1, wherein the processor is further configured to determine the receive window size based on at least one of terminal mobility related information and handover related information.

7. The first electronic device of claim 1, wherein the processor is further configured to determine the receive window size based on a data transmission rate between a terminal and a base station and a data transmission rate between the base station and a server.

8. The first electronic device of claim 1, wherein the processor is further configured to:
   increase the receive window size reference value if a difference between an RTT minimum value that is measured in a first section and an RTT minimum value that is measured in a second section exceeds a maximum value in a preset range, and
   decrease the receive window size reference value if the difference between the RTT minimum value that is measured in the first section and the RTT minimum value that is measured in the second section is smaller than a minimum value in the reset range.

9. A method for controlling a transmission control protocol (TCP) of a first electronic device, the method comprising:
   setting a receive window size reference value based on a measured packet round trip time (RTT);
   identifying first channel information related to a wireless channel of the first electronic device;
   determining a receive window size based on the first channel information, second channel information associated with the receive window size reference value, and the receive window size reference value; and
   transmitting the determined receive window size to a second electronic device,
   wherein the determined receive window size is determined based on the receive window size reference value when a difference between the first channel information and the second channel information is greater than a threshold.

10. The method of claim 9, wherein the identifying of the channel information comprises identifying the second channel information based on a predetermined period.

11. The method of claim 9, wherein the first channel information and the second channel information comprises at least one of data throughput, reference signal receive power, reference signal receive quality, or a receive signal strength indicator.

12. The method of claim 10, wherein the determining of the receive window size comprises increasing or decreasing the set receive window size reference value based on the second channel information and the first channel information.

13. The method of claim 12, wherein the determining of the receive window size comprises:
   decreasing the set receive window size reference value if the first channel information has a value that is smaller than a minimum value of a range of the second channel information; and
   increasing the set receive window size reference value if the first channel information has a value that exceeds a maximum value of the range of the second channel information.

14. The method of claim 10, wherein the determining of the receive window size comprises determining the receive window size based on at least one of terminal mobility related information and handover related information.

15. The method of claim 10, wherein the determining of the receive window size comprises determining the receive window size based on a data transmission rate between a terminal and a base station and a data transmission rate between the base station and a server.

16. The method of claim 9, wherein the setting of the receive window size reference value comprises:
   increasing the receive window size reference value if a difference between an RTT minimum value that is measured in a first section and an RTT minimum value that is measured in a second section exceeds a maximum value in a preset range; and decreasing the receive window size reference value if the difference between the RTT minimum value that is measured in the first section and the RTT minimum value that is measured in the second section is smaller than a minimum value in the reset range.

* * * * *